United States Patent
Huang et al.

(10) Patent No.: US 6,329,514 B1
(45) Date of Patent: Dec. 11, 2001

(54) FIBER REACTIVE DYESTUFFS

(75) Inventors: Huei Ching Huang, Ba Te; Keh Loong Chen, Taoyuan Hsien; Mao Cheng Hsu, Pin Zhen; Ta Chung Yin, Taiepi, all of (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 09/500,017

(22) Filed: Feb. 8, 2000

(51) Int. Cl.⁷ .......................... C09B 62/503; D06P 1/384
(52) U.S. Cl. ................. 534/612; 534/618; 534/622; 534/635; 534/636; 534/637; 534/638; 534/642
(58) Field of Search .................................. 534/612, 618, 534/622, 635, 636, 637, 638, 642

Primary Examiner—Fiona T. Powers

(74) Attorney, Agent, or Firm—Bacon & Thomas

(57) ABSTRACT

A fiber reactive dyestuff of the following formula (I)

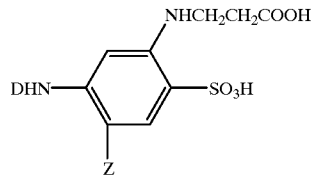

wherein the definition of D, and Z the same meaning as given in the description. The fiber reactive dyestuff of the present invention is suitable for dyeing and printing on cellulose fiber or fiber materials containing cellulose. Dyed material with various excellent properties in dyed color can be obtained, showing especially outstanding performance in the property of wash fastness.

29 Claims, No Drawings

FIBER REACTIVE DYESTUFFS

FIELD OF THE INVENTION

The present invention relates to reactive dyestuffs, in particular relates to novel fiber reactive dyestuffs suitable for use in dyeing hydroxy or amino containing fibers, especially fiber materials containing cellulose.

BACKGROUND OF THE INVENTION

Fiber reactive dyestuffs have been known for many years. Their main characteristic is that they possess one or more reactive groups which can be reacted with hydroxy or amino containing fiber materials to form a covalent bond. For example, U.S. Pat. Nos. 4,703,112, 5,484,899, and G.B. Pat. No. 1,353,899 disclose fiber reactive dyestuffs which are applied by exhaust, printing or continuous dyeing.

SUMMARY OF THE INVENTION

The present invention relates to novel fiber reactive dyestuffs of the formula (I)

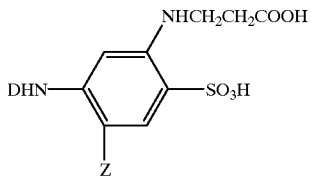

(I)

wherein:

Z is hydrogen atom or —N=N—$Z_1$, wherein $Z_1$ is

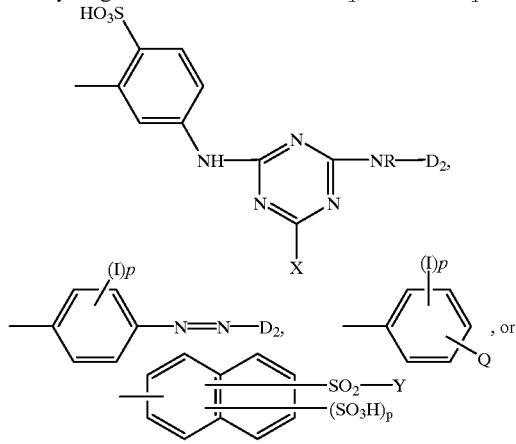

wherein

X is fluorine atom, chlorine atom, hydroxyl, carboxypyridinium such as 3-carboxypyridinium, $C_{1-4}$ alkoxyl, —NHCN,

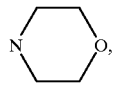

N,N-di-β-hydroxyethylamino, amino, amino derivatives such as substituted amino, or phenylamino which is substituted —$SO_2(CH_2)_2OSO_3HSO_3H$, $SO_3H$, Cl, COOH, $C_{1-4}$ alkyl, or alkoxyl;

Y is —OH, —$CH_2$=$CH_2$ or —$CH_2$—$CH_2$—W, W is a leaving group which is eliminable by a base;

I is —$SO_3H$, $C_{1-4}$ alkoxyl, $C_{1-4}$ alkyl or $C_{1-4}$ alkoxycarbonyl;

P is 0, 1, 2, or 3;

Q is —$SO_2$—Y, —CONH—$(CH_2)_n$—$SO_2$—Y, —O—$(CH_2)_m$—CONH—$(CH_2)_n$—$SO_2$—Y, or —NH—CO—T, wherein Y is defined as the above, T is α,β-dihalopropionyl or α-haloacryloyl, m and n each independent is 1, 2, 3, 4, 5, or 6;

$D_2$ is

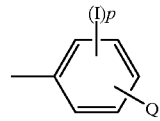

wherein I, p, Q, and Y are defined as the above;

R is hydrogen atom, $C_{1-4}$ alkyl, or $C_{1-4}$ alkyl which is substituted by halogen atom, hydroxyl, cyano, $C_{1-4}$ alkoxyl, $C_{1-4}$ alkoxycarbonyl, carboxyl, sulfonyl, or sulfato;

D is hydrogen atom or

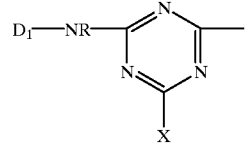

wherein X and R are defined as the above; only one of D and Z maybe a hydrogen atom. That is, if D is hydrogen Z is —N=N—$Z_1$; if Z is hydrogen D is

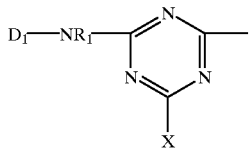

$D_1$ is a chromophore with or without reactive groups, wherein said reactive groups are selected from the above Q group, said chromophore is selected from the group consisting of:

(a) formazan chromophore

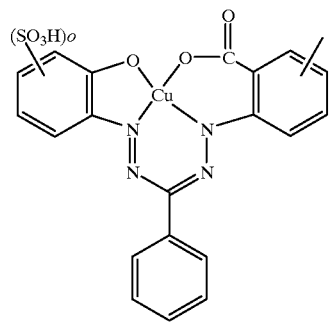

or

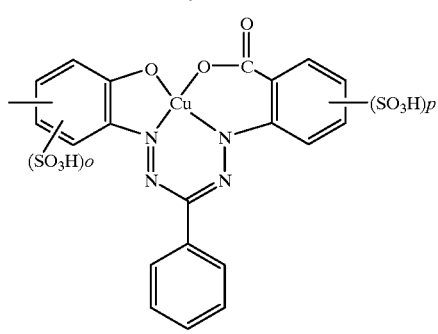

wherein p is 0, 1, 2, or 3, o is 0, 1, 2, or 3;

(b) anthraquinone
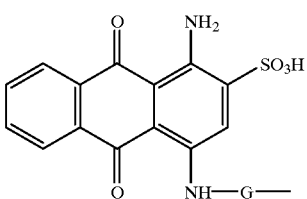
wherein G is an arylamine or (cyclo) alkylene group which is substituted by $C_{1-4}$ alkyl or sulfonyl;
(c) phthalocyanine
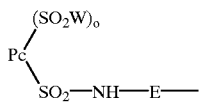
wherein Pc is copper phthalocyanine or nickel phthalocyanine; W is —OH or —NH$_2$; E is arylene such as phenylene or alkylene such as ethylene; o is defined as the above;
(d) triphendioxazine
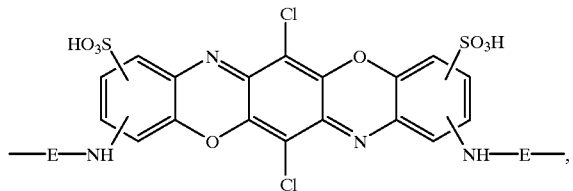
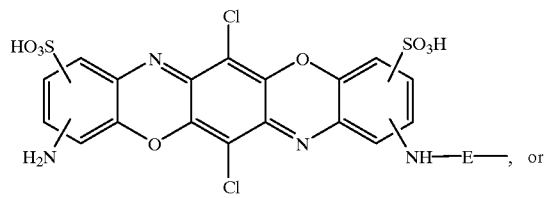
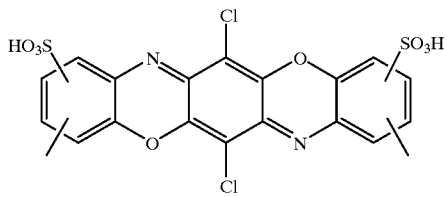
E is defined as the above;
(e) monoazo
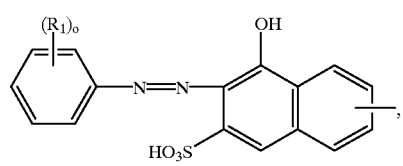
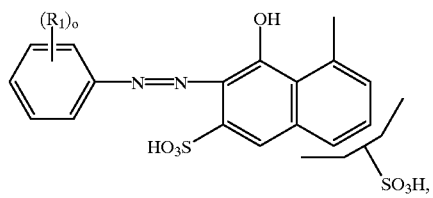
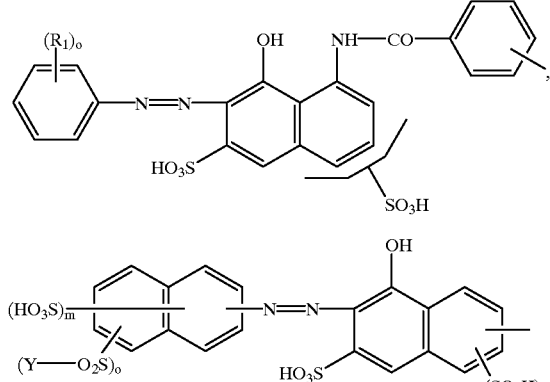
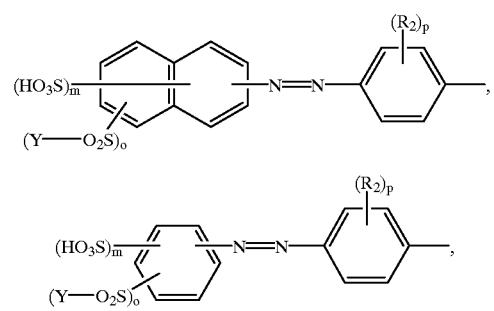
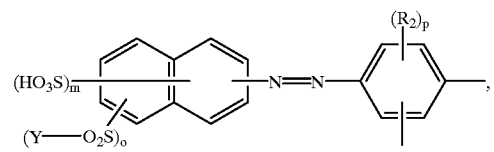
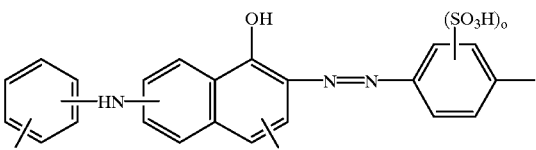
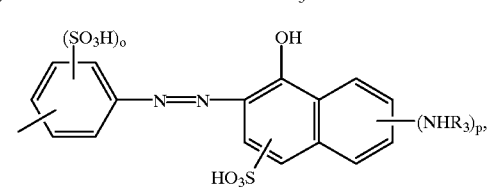
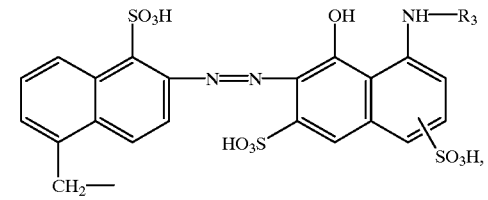

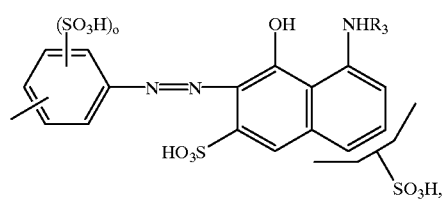
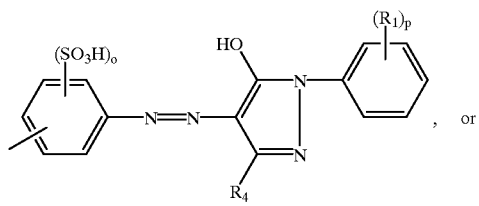, or
wherein
$R_1$ is $C_{1-4}$ alkyl, $C_{1-4}$ alkoxyl, hydroxyl, carboxyl, sulfonyl, or $-SO_2-Y$, Y is defined as above;
$R_2$ is $C_{1-4}$ alkyl, $C_{1-4}$ alkoxyl, amino, acetylamino, ureido, or sulfonyl;
$R_3$ is $C_{1-4}$ acyl or benzoyl;
$R_4$ is $C_{1-4}$ alkyl or carboxyl;
$R_5$ and $R_6$ are $C_{1-4}$ alkyl; $R_7$ is hydrogen, carbonamido, sulphomethyl or methyl sulfonic acid;
m, n, o and p is defined as the above;
(f) polyazo
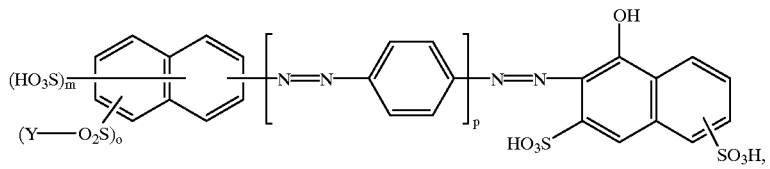
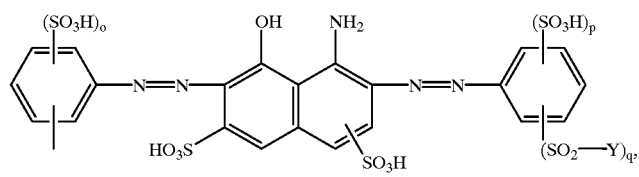
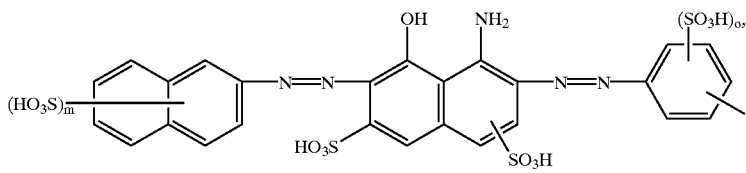
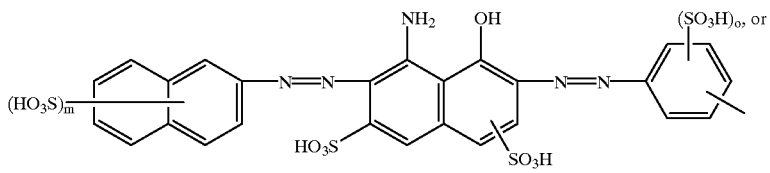
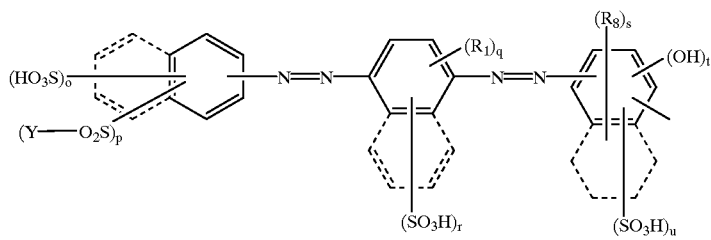

wherein $R_8$ is $C_{1-4}$ alkyl, $C_{1-4}$ alkoxyl, carboxyl, sulfonyl, acetyl, acetylamino, ureido, or —$SO_2$—Y;
q, r, s, t and u is each independently is 0, 1, 2 or 3;
$R_1$, Y, m, n, o and p are defined as above; or
(g) a metallized monoazo or diazo dye.
The preferred examples of $D_1H$ are as below:
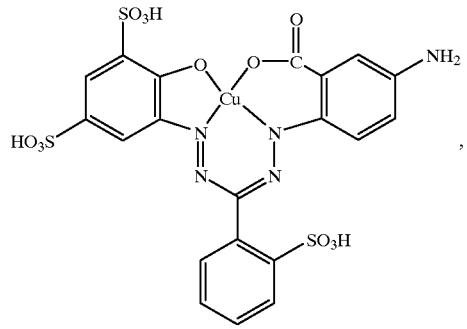
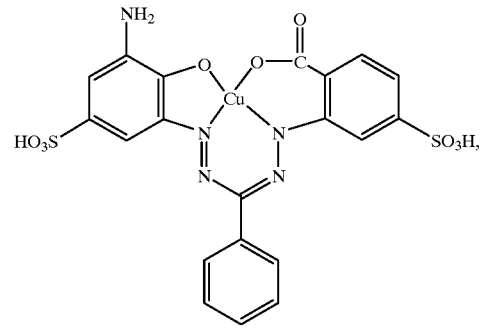
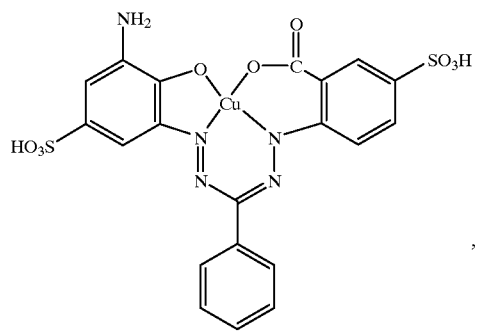
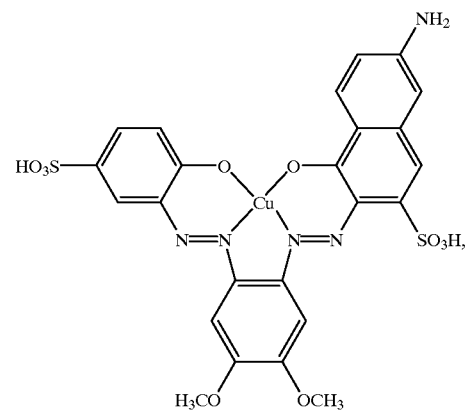
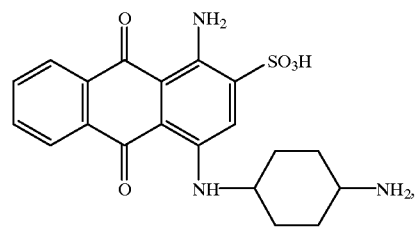
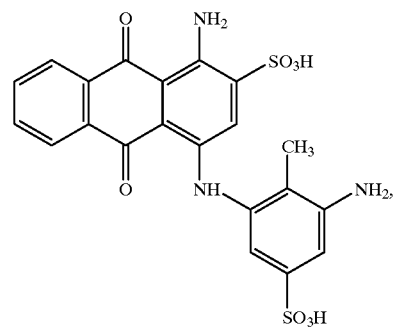
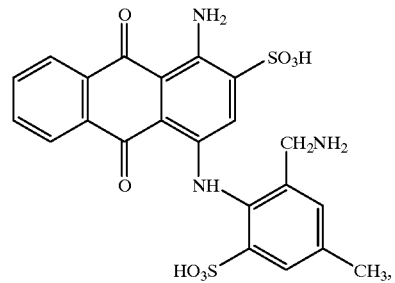
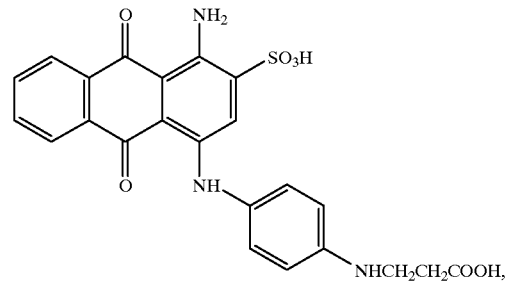

-continued
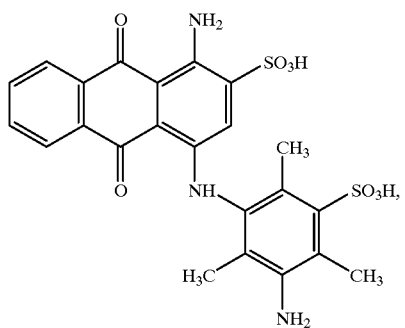
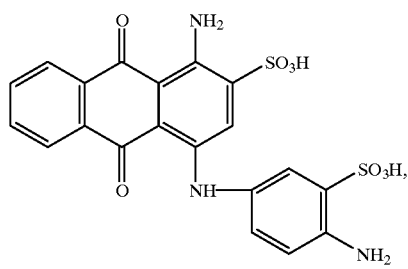
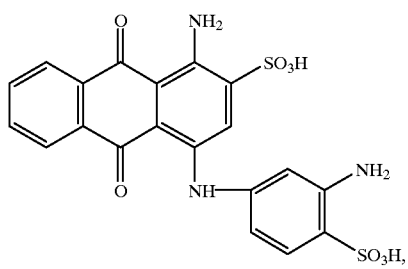
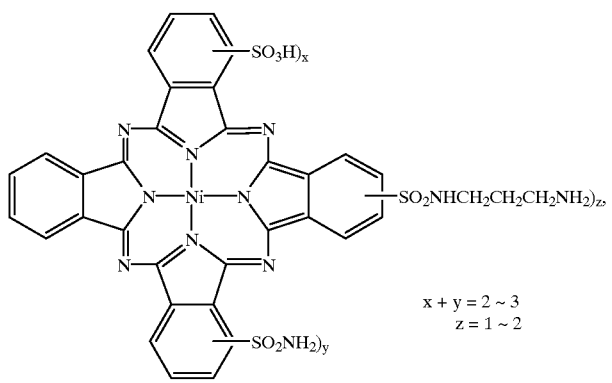
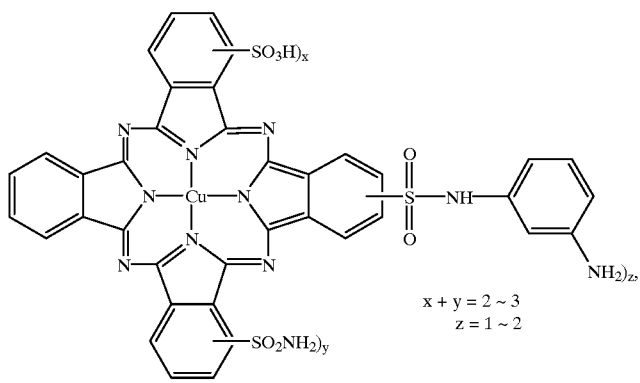

-continued
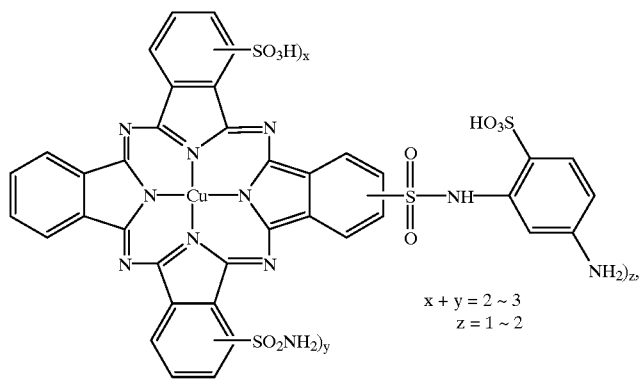
x + y = 2 ~ 3
z = 1 ~ 2
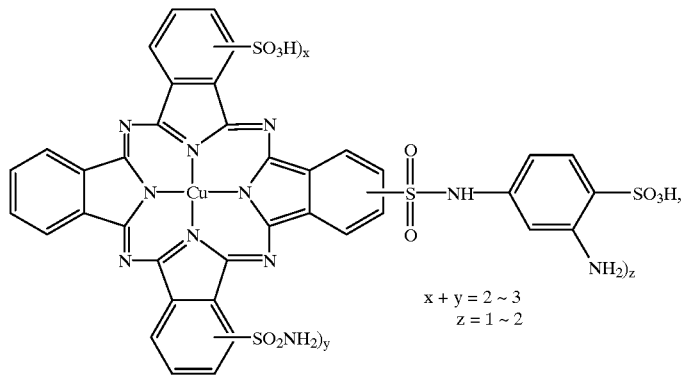
x + y = 2 ~ 3
z = 1 ~ 2
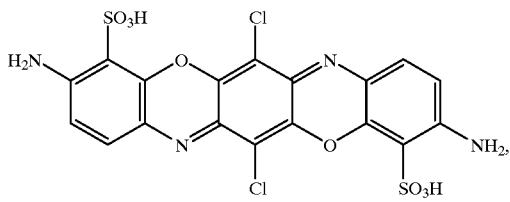
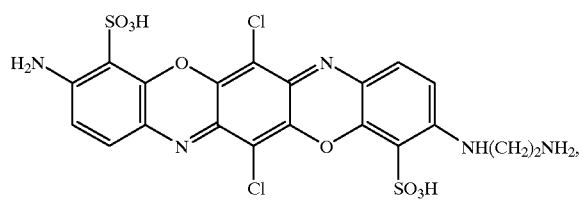
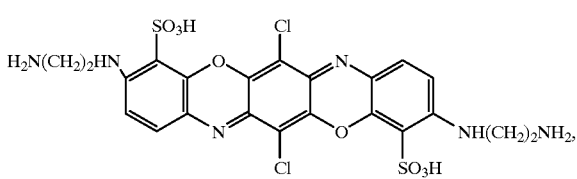
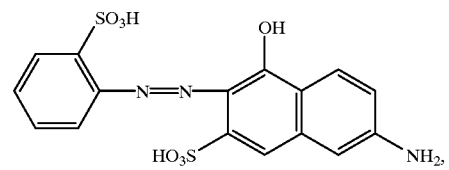
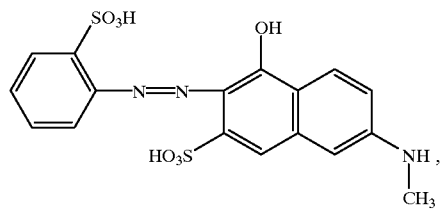
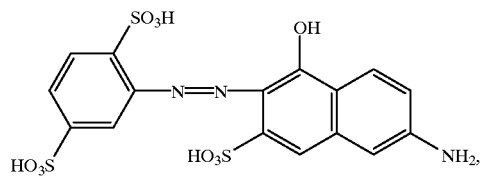
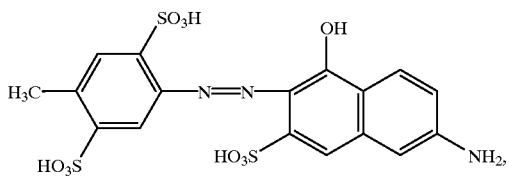
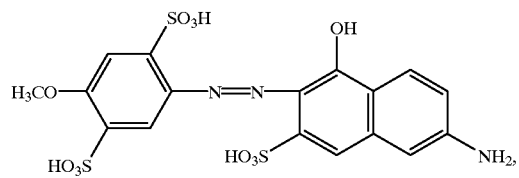

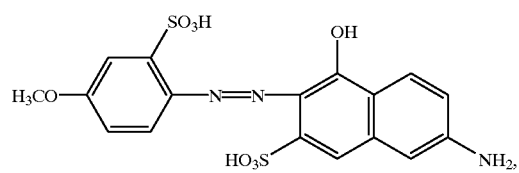
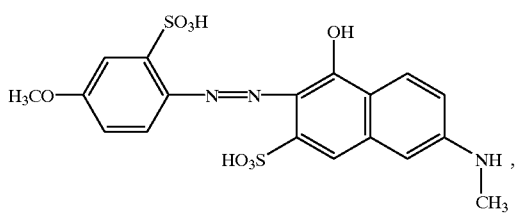
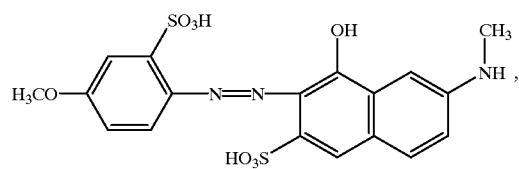
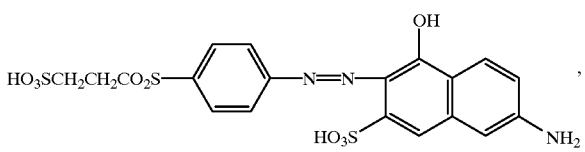
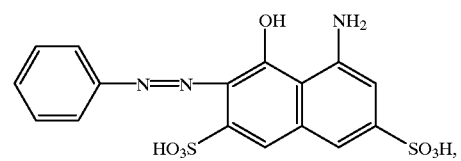
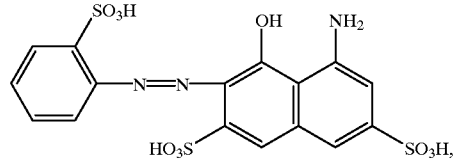
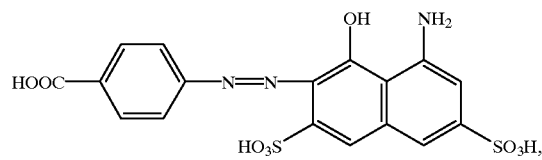
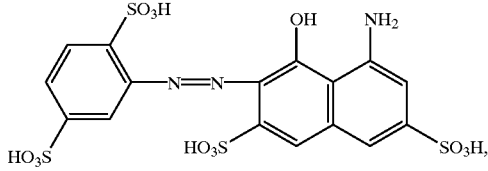
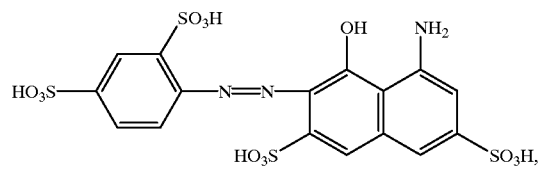
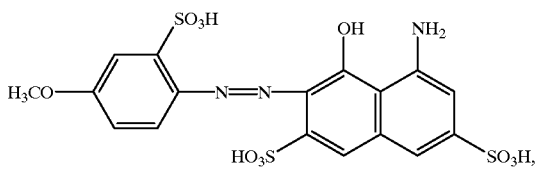
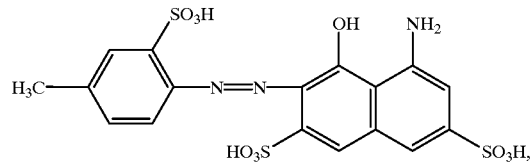
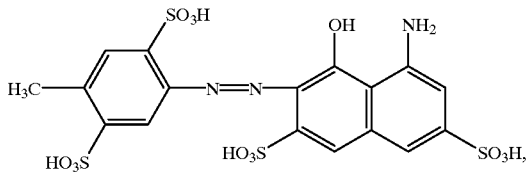
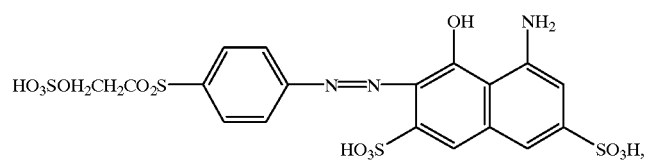
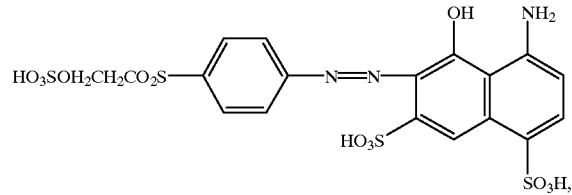
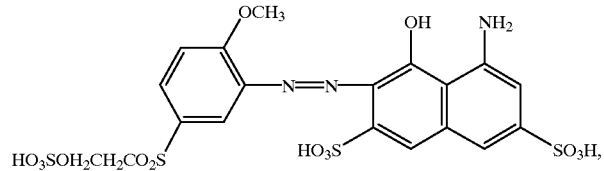

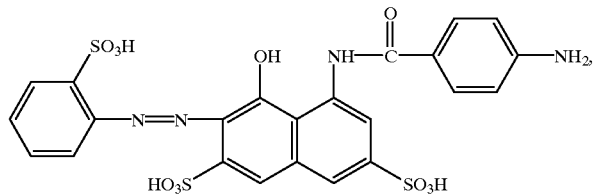
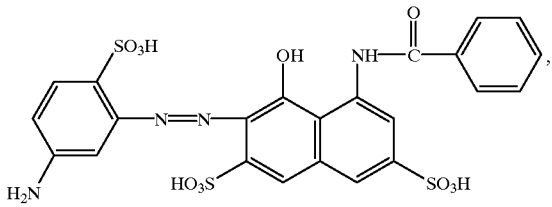
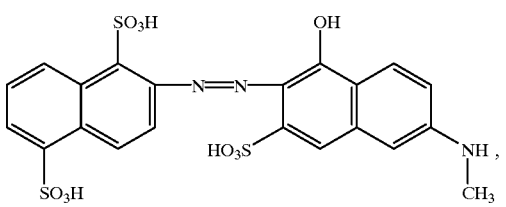
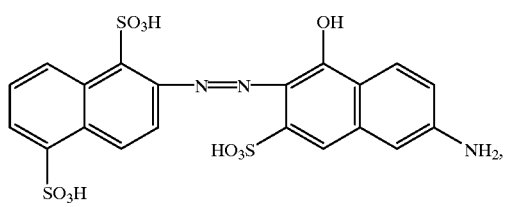
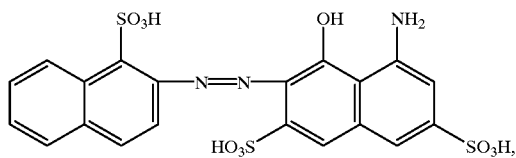
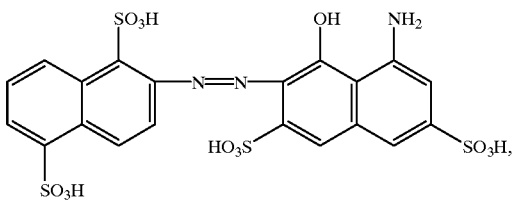
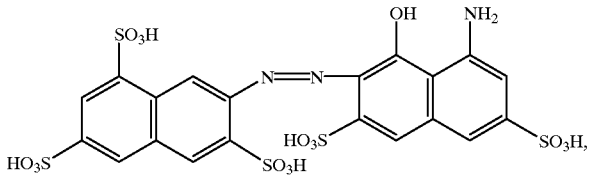
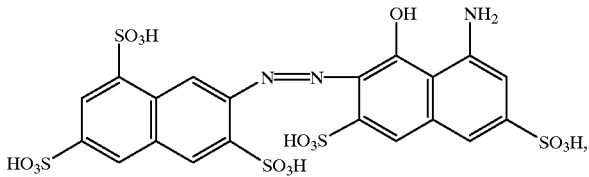
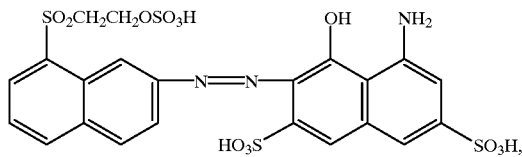
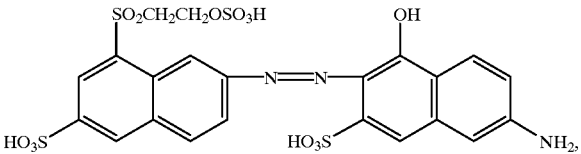
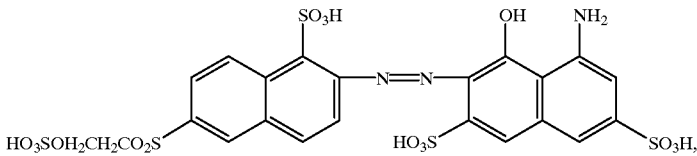
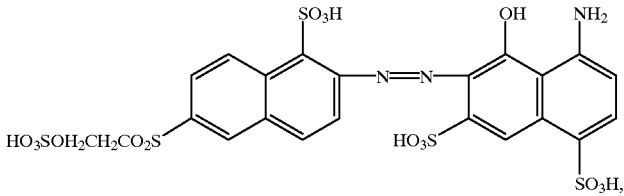

-continued
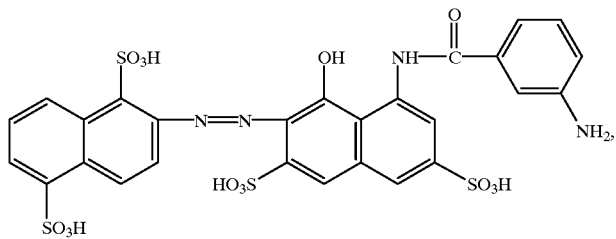
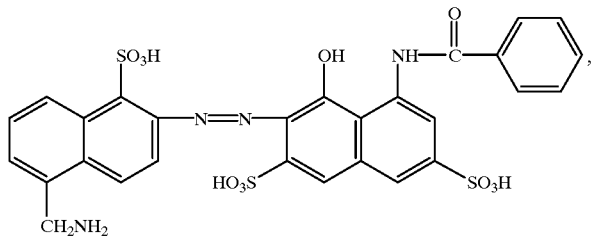
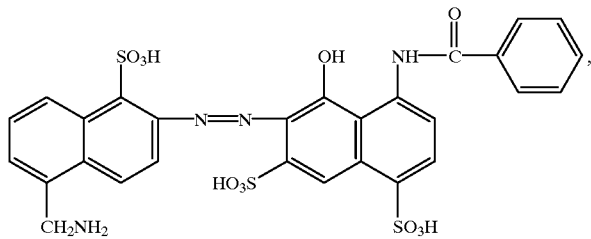
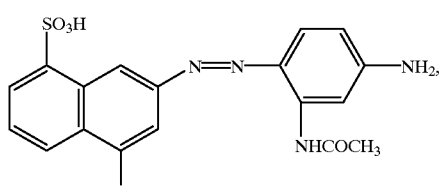
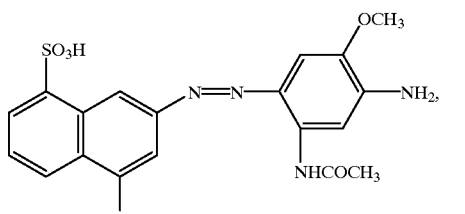
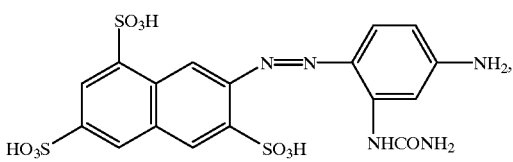
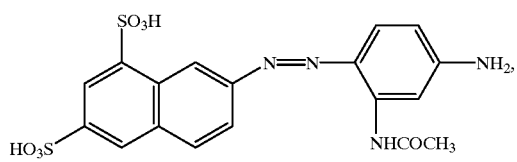
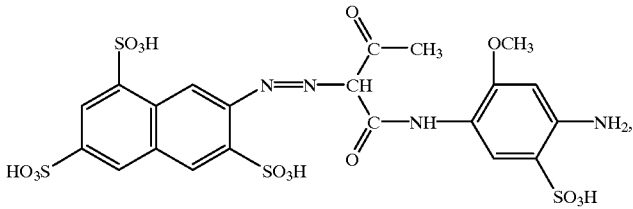
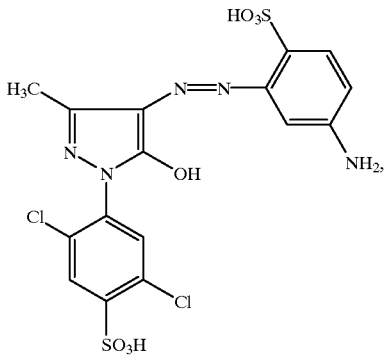
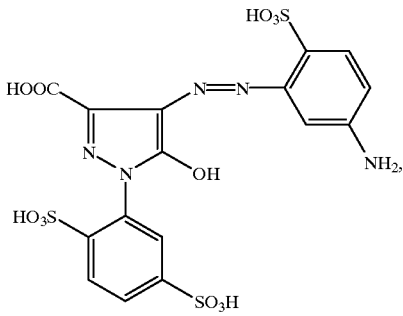

-continued
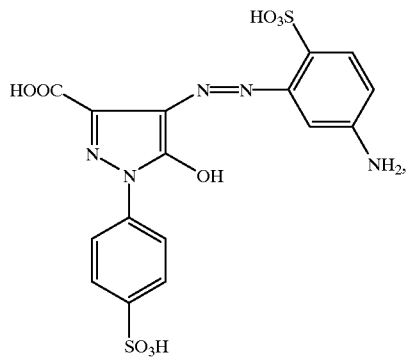
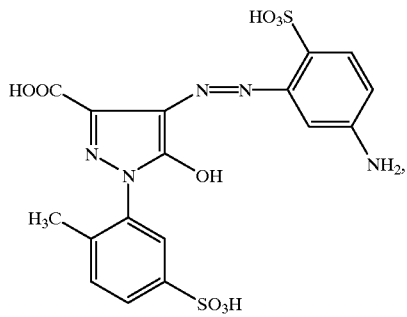
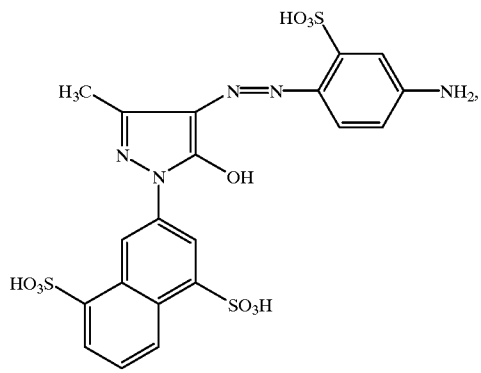
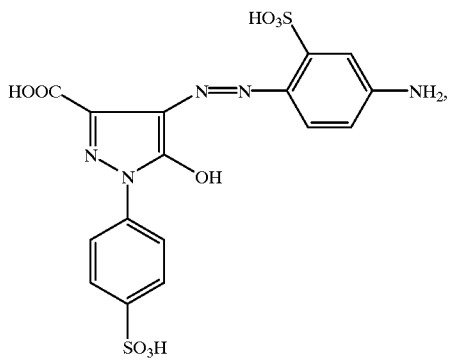
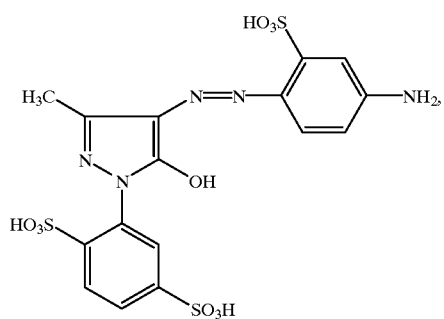
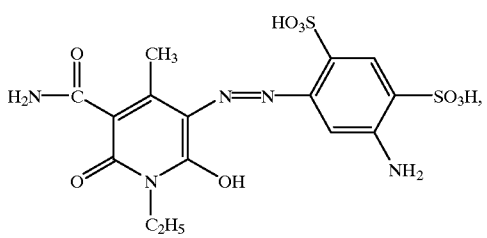
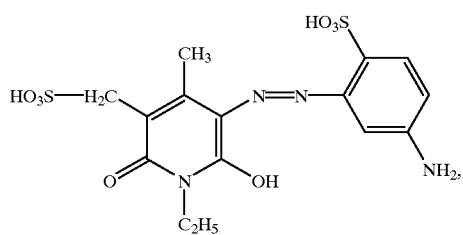
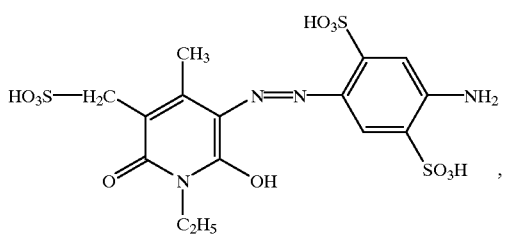
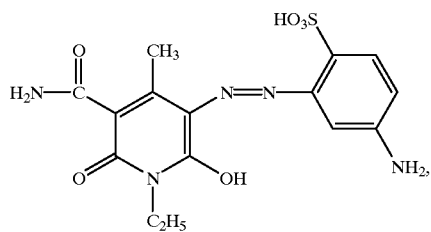
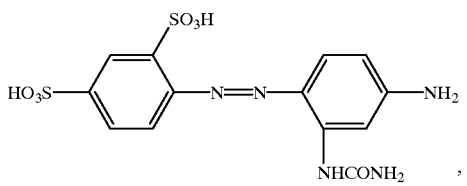
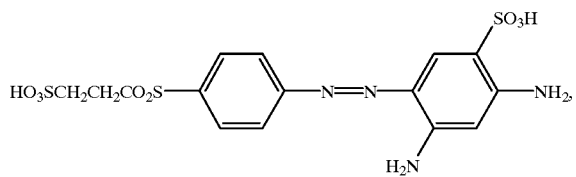

-continued
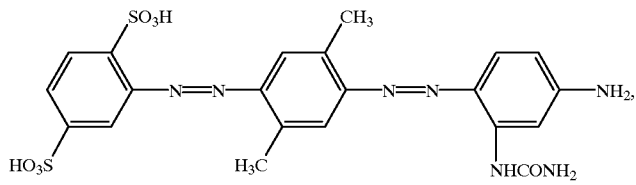
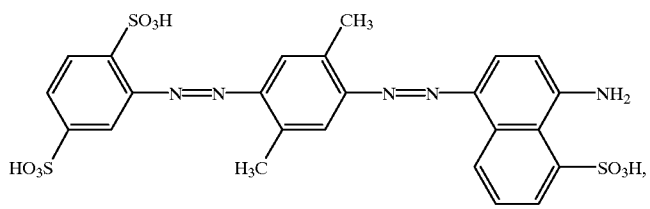
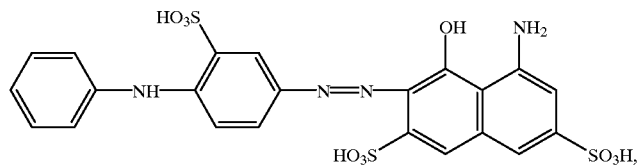
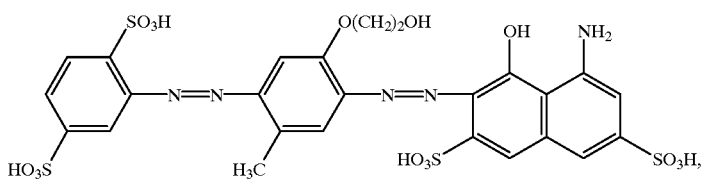
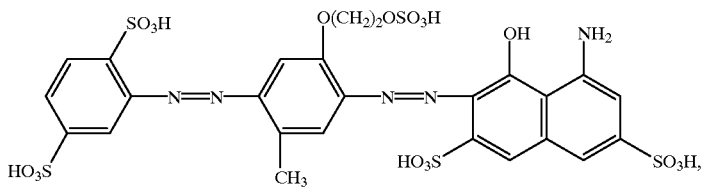
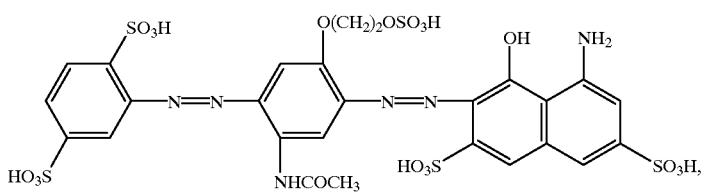
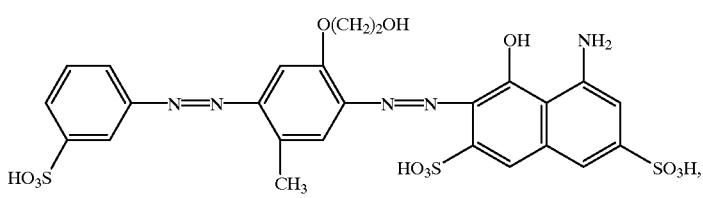
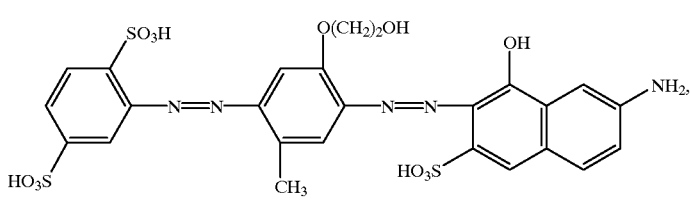
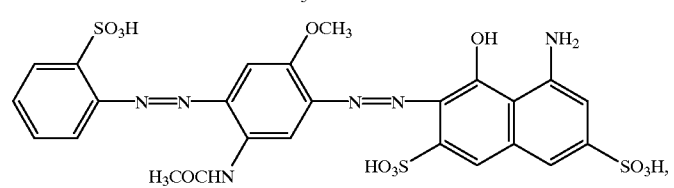

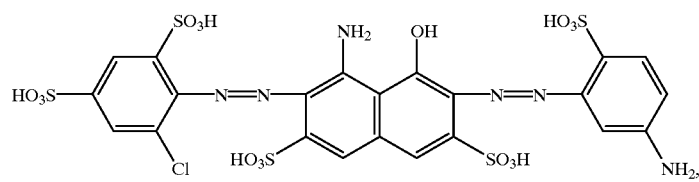
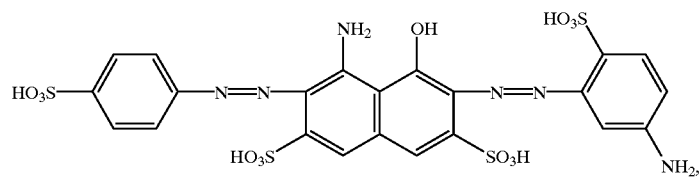
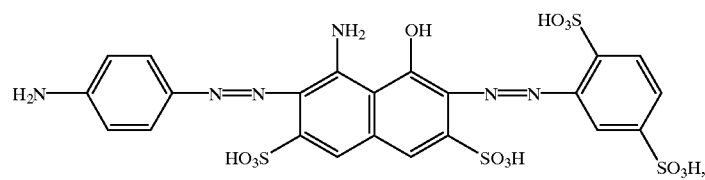
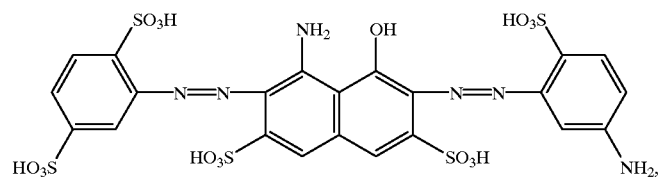
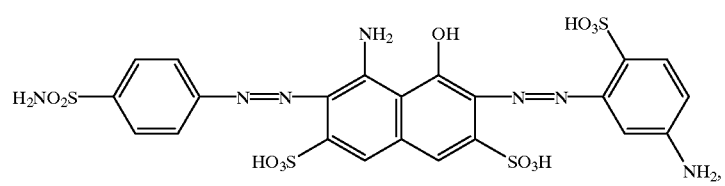
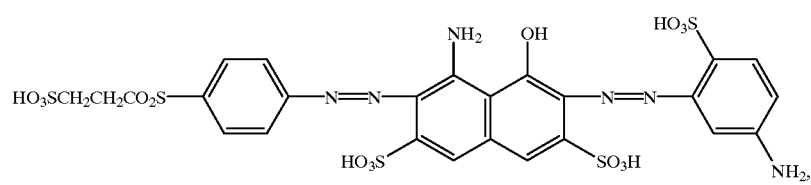
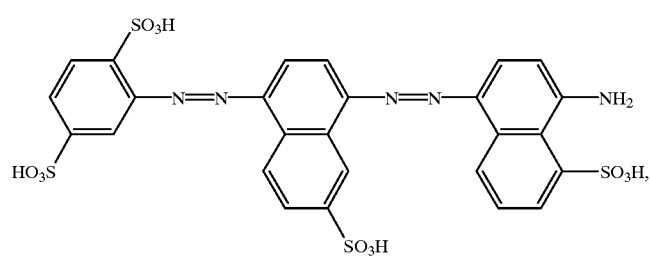
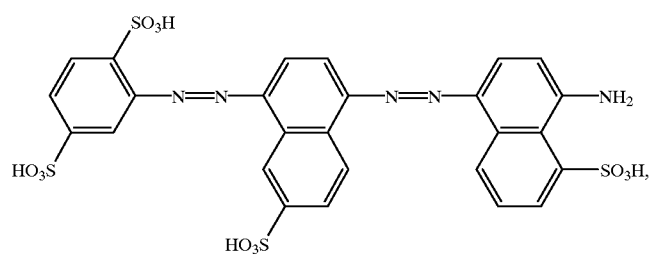

-continued
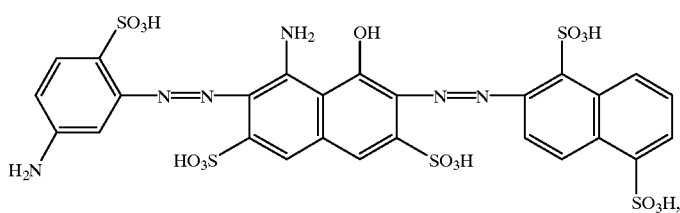
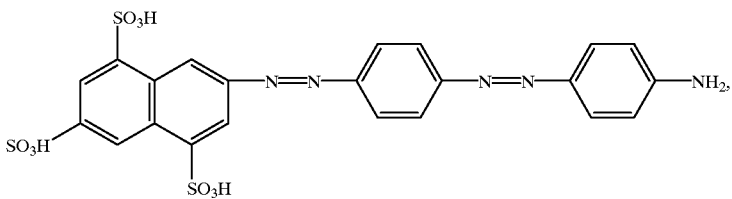
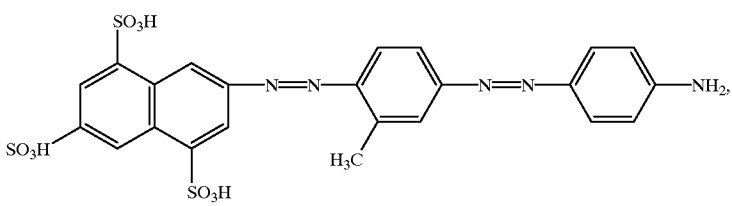
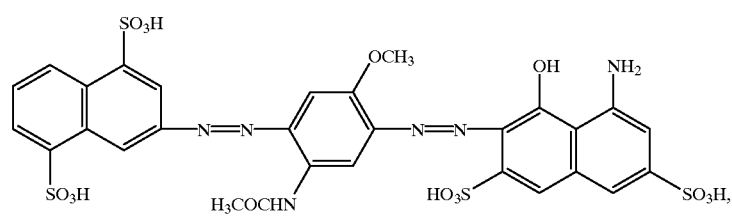
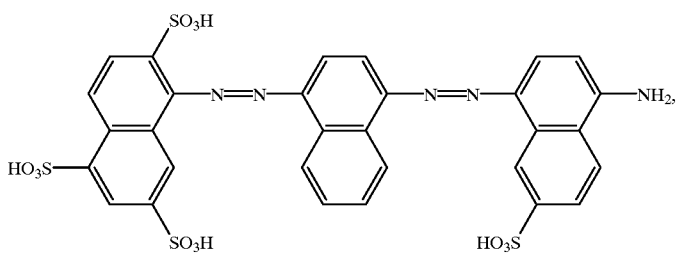
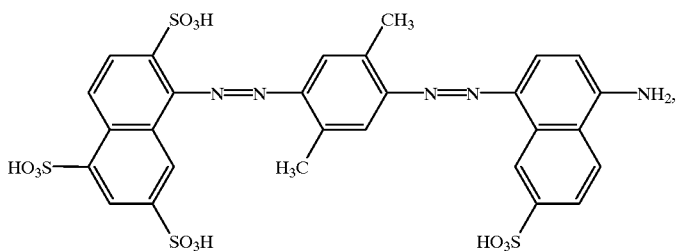
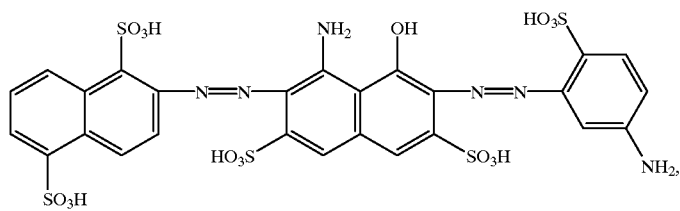

-continued
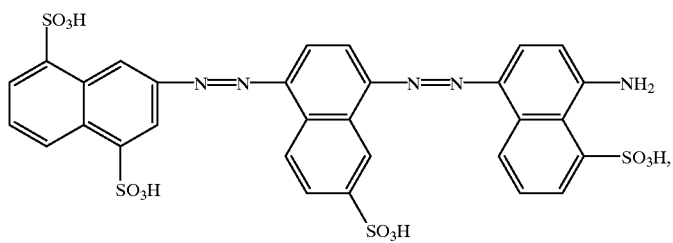
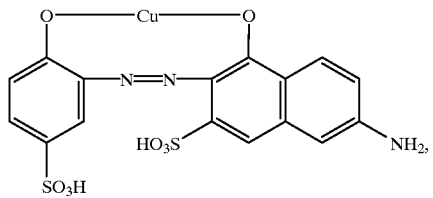
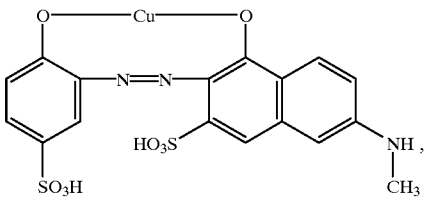
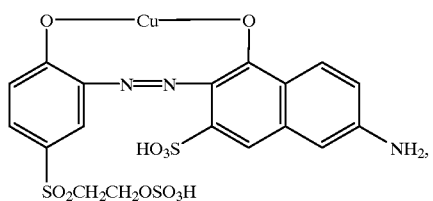
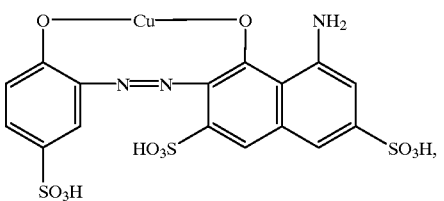
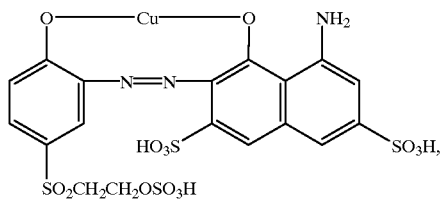
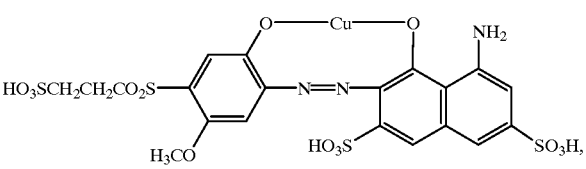
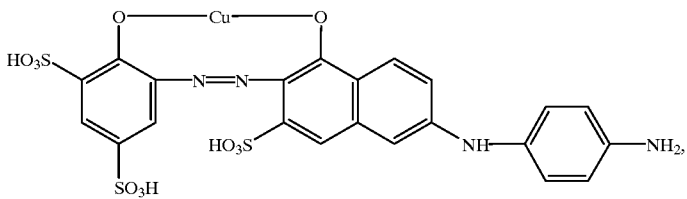
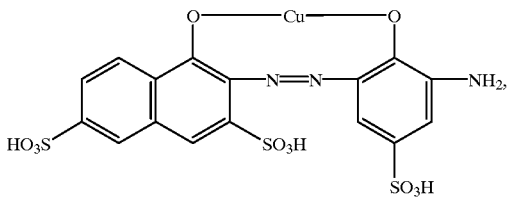
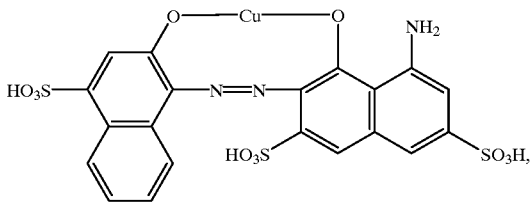

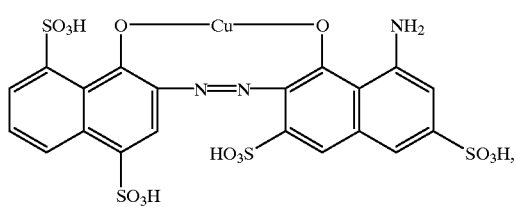
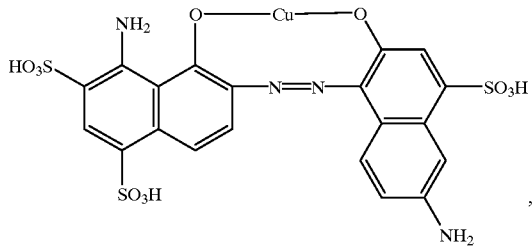
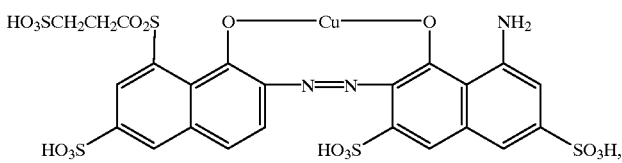
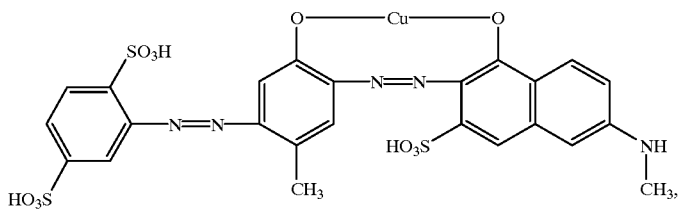
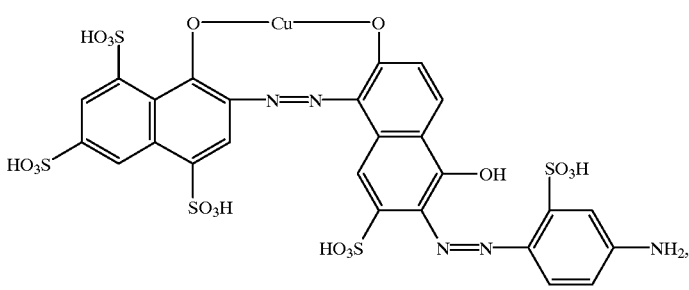
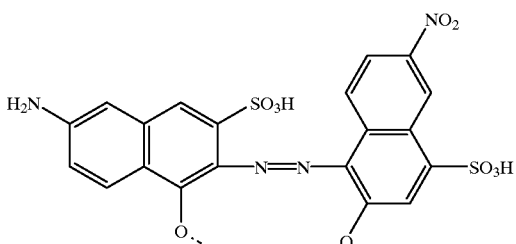
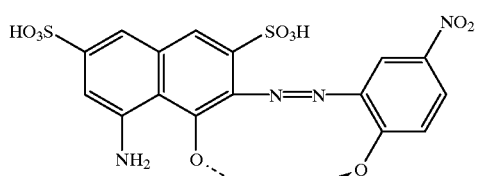
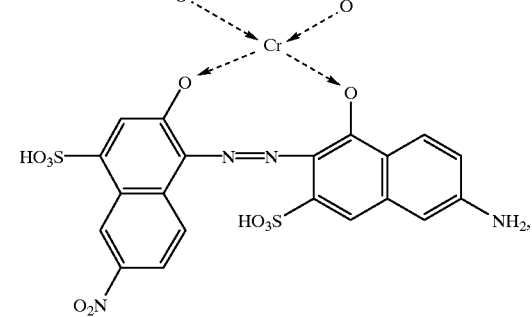
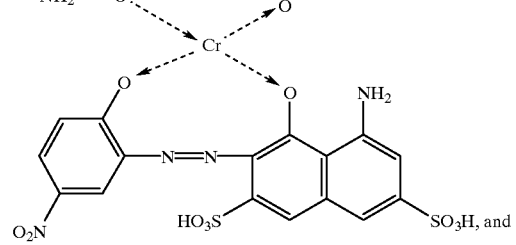

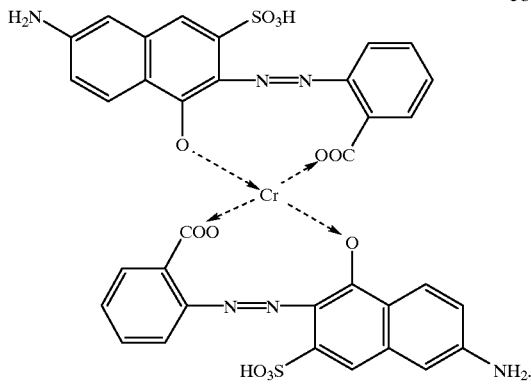

For convenience sulphonic acid groups are depicted as free acids. More usually they exists in the form of water-soluble salts, especially alkali metal salts, alkaline earth metal salts, ammonium salts or substituted ammonium salts, and, more preferably, lithium salts, sodium salts, potassium salts, ammonium salts or triethanolamine salts.

The dyestuffs of formula (I) of the present invention can be synthesized by known preparation methods. There is no special limit to synthetic steps. Examples of synthetic methods are:

a) The diazonium salt derived from $Z_1$—$NH_2$ is coupled with 4-amino-2-(2-carboxyethyl)amino benzene sulfonic acid to yield compounds of following formula (II).

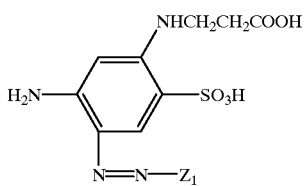
(II)

wherein $Z_1$ is defined as the above.

b) 4-amino-2-(2-carboxy ethyl) amino benzene sulfonic acid is condensed with the halotriazine of formula (A), then the reaction product is condensed with $D_1$—NHR wherein $D_1$ and R are defined as above to yield compounds of formula (III). Furthermore, it is possible to alter the reaction sequence. For example, first of all, $D_1$—NHR can be condensed with the halotriazine of formula (A) and the resulting reaction product is condensed with 4-amino-2-(2-carboxy ethyl)amino benzene sulfonic acid. The compound (III) is obtained,

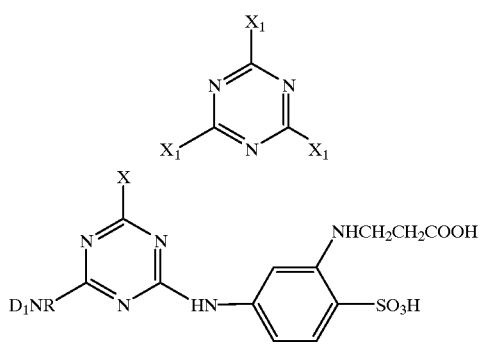
(A)
(III)

wherein $X_1$ is a fluorine atom or chlorine atom, X, $D_1$ and R are defined as above.

C) The compound of formula (III) is reacted with a diazonium salt derived from $Z_1$—$NH_2$ to obtain the compounds of formula (IV)

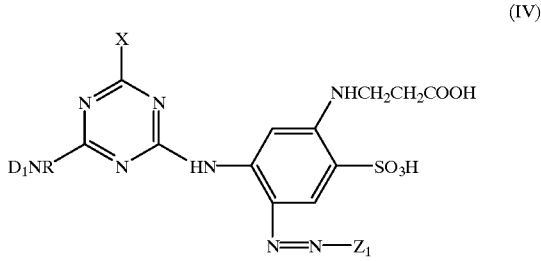
(IV)

wherein X, $D_1$, $Z_1$, and R are defined as above. The compounds (IV) can be synthesized by some other methods. For example, the diazonium salt derived from $Z_1$—$NH_2$ is coupled with 4-amino-2-2-carboxyethyl amino benzene sulfonic acid and the resulting reaction product is condensed with a halotriazine of formula (A), followed by reaction with $D_1$—NHR to yield a compound of formula (IV).

Another method for the preparation of compounds of formula (IV) is as follows: first, compound $D_1$—NHR is condensed with the halotriazine of formula (A). Second, the diazonium salt derived from $Z_1$—$NH_2$ is coupled with 4-amino-2-2-carboxyethyl amino benzene sulfonic acid. Third, the product of the first step is condensed with the product of second step to obtain the compound of formula (IV).

The preparation methods used will be known to those people skilled in the arts. For example, the coupling reaction of diazonium salts onto coupling components is carried out at a pH value between 6 to 8 and temperature between 0 to 25° C. The condensation reaction of an amine is carried out at a pH value between 1 and 10 and temperature between 0 to 80° C.

The reactive dyestuffs of the present invention can be used to amine dye or print hydroxy or amino containing materials such as cotton, wool and nylon, especially cellulose or materials containing cellulose. All natural and regenerated cellulose fibers (e.g. cotton, linen, jute, ramie fiber, viscose rayon) or fiber materials containing cellulose are materials to which the fiber reactive dyestuffs can be applied.

The dyestuffs of the present invention can be used to colour fiber materials by many known methods, for example, exhaust dyeing, continuous dyeing or cold pad batch dyeing.

The dyeing or printing of the dyestuffs of the present invention can be carried out by conventional methods. Exhaust dyeing is carried out by using inorganic salts (e.g. anhydrous sodium sulfate and sodium chloride) and acid-binding agents (e.g. sodium carbonate, sodium hydroxide). Inorganic salts and alkali can be added to the dyebath either in one lot or by portionwise addition. In addition, dyeing assistants can be added. The range of dyeing temperature is from 20° C. to 90° C. Preferably, the temperature for dyeing is from 40° C. to 70° C.

In a cold-pad-batch application, dye, alkali and auxiliaries are padded from the trough liquor. The padded, squeezed substrate is often rolled onto an A-frame and batched at room temperature to allow dye fixation to take place.

Continuous dyeing can be divided into two different methods. In the one-bath padding application, dye, alkali (e.g. sodium carbonate or sodium bicarbonate) and customary auxiliaries are padded from the trough liquor, the padded, squeezed substrate is then dried by either baking or steam. In the two bath padding application, the substrate is padded through a dye solution bath, pre-dried, then passed through an alkali (e.g. sodium hydroxide or sodium silicate) bath, then fixed either by baking or steam.

In textile printing, a substrate is treated with a printing paste containing, a well-known acid-binding agent (e.g. sodium bicarbonate), thickener, and completing the dye fixation by dry heat or steam. The dyeing or printing methods employed in the process of the present invention are not limited to these methods.

The dyestuffs of the present invention have good dyeing properties such as build-up, reproducibility and levelness for printing and dyeing.

The present invention is demonstrated in more detail with references to the following examples, which are only illustrative and are not intended to limit the scope of the present invention.

The compounds of the following examples are represented by free acids, but actual form can be salts, or more possibly alkali metal salts, especially sodium salts. In these examples, parts and % are by weight, and the temperature is in degrees Celsius, ° C.

EXAMPLE 1

Cyanuric chloride (8.3 parts) was dispersed in ice water (80 parts), and then a solution of 2-methylamine-5-naphthol-7-sulfonic acid (10.8 parts) in 80 parts of water was added. The reaction temperature was controlled at 6–10° C. until reaction was complete. The diazonium salt prepared from 11 parts of 2-naphthylamine-1,5-disulfonic acid was added to the above solution. The pH value was controlled between 6.0–6.5 and the temperature was controlled between 8–12° C., then stirred until completion of the reaction.

A solution of 4-amino-2-(2-carboxyethyl)amino benzene sulfonic acid (11.2 parts) in water (30 parts) was added to the above solution. The reaction temperature was raised to 40–45° C. and the pH was controlled between 4.0–4.5 until completion of the reaction. The solution was sprayed to yield an orange dyestuff of formula (1), $\lambda_{max}$=489 nm, the dyestuff (I) can be used to dye hydroxy or amino containing fibers or fabrics orange shades, with excellent properties.

EXAMPLE 2

To a dispersion of cyanuric chloride (16.5 parts) in ice water (110 parts), 1-amino-8-naphthol-3,6-disulfonic acid (27.5 parts) in 60 parts of water was added with stirring. The reaction temperature was controlled at 6–10° C. until reaction was complete. The diazonium salt prepared from 14.8 parts of 2-aminobenzezesulfonic acid was added to the above solution. The pH value was controlled between 6.0–6.2 and the temperature was controlled between 8–15° C., and stirring was continued until reaction was complete.

A solution of 4-amino-2-(2-carboxy ethyl)amino benzene sulfonic acid (23 parts) in water (50 parts) was added to the above solution. The reaction temperature was raised to 40–45° C. and the pH was controlled between 4.0–4.5. Upon completion of reaction, the resultant solution was evaporate to dryness to obtain a rose red dyestuff of formula (2), $\lambda_{max}$=515.5 nm. The dyestuff can be used to dye hydroxy or amino containing fibers or fabrics in rose red shades, with excellent properties.

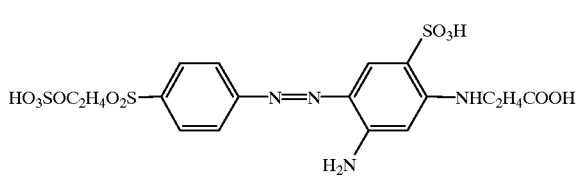

(2)

EXAMPLE 3

4-amino-2-(2-carboxyethyl)amino benzene sulfonic acid (5.9 parts) was added to the diazonium salt prepared from 6.4 parts 4-(2-sulfatoethylsulfonyl)aniline. The pH value was controlled between 4.5–5.0 until reaction was complete. The resulting solution was salted with 20 parts of NaCl. After filtering off the resulting precipitated solid and drying, an orange dyestuff of formula (3) was obtained, $\lambda_{max}$=451.5 nm. The dyestuff can be used to dye hydro or amino containing fibers or fabrics in orange shades, with excellent properties.

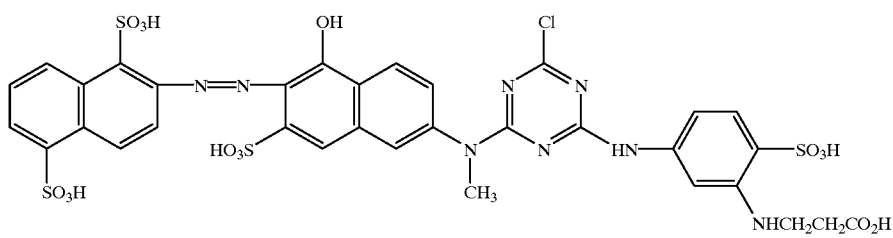

(3)

EXAMPLE 4

4-amino-2-(2-carboxyethyl)amino benzene sulfonic acid (5.18 parts) was added to the diazonium salt prepared from 8.22 parts of 6-(2-sulfatoethylsulfonyl)-2-amino-1-naphthylsulfonic acid. The reaction temperature was controlled at 15° C. and the pH value between 4.5–5.0 until reaction was complete. The resulting solution was salted with 20 parts of NaCl. After filtering and drying, an orange dyestuff of formula (4) was obtained, $\lambda_{max}$=471 nm. The dyestuff can be used to dye hydroxy or amino containing fibers or fabrics in orange shades, with excellent properties.

(1)

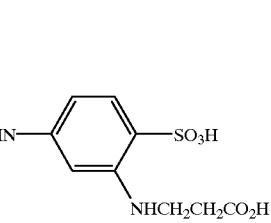

(4)

EXAMPLE 5

M-aminophenyl urea (7.56 parts) was first uniformly dispersed in water (50 parts), then the solution was added to the diazonium salt prepared from 19.17 parts of 7-amino-1,3,6-trisulfonic acid-naphthalene. The reaction temperature was controlled between 8–10° C. and the pH value was controlled at 4.0 until reaction was complete. A solution of cyanuric chloride (9.22 parts) was added to the above solution. The reaction temperature was controlled between 5–8° C. and the pH value was controlled between 5.0–5.5 until reaction was complete. 4-Amino-2-(2-carboxyethyl) amino benzene sulfonic acid (12.87 parts) was added to the above solution. The reaction temperature was controlled at 45° C. and the pH value was controlled between 6.0–6.5. After completion of reaction, the temperature of the solution was cooled to 7–10° C. The diazonium salt prepared from 14.2 parts of 4-(2-sulfatoethylsulfonyl)aniline was added to the above solution and the pH value was adjusted to 6.0. Upon completion of the reaction, the solution was desalted and water removed to yield yellow dyestuff of formula (5), $\lambda_{max}$=428 nm. The dyestuff can be used to dye hydro or amino containing fibers or fabrics in yellow shades, with excellent properties.

EXAMPLE 6

Cyanuric chloride (8.75 parts) was dispered in ice water (50 parts), then a solution of 4-amino-2-(2-carboxyethyl) amino benzene sulfonic acid (12.14 parts) in 70 parts of water was added. At a temperature of 5–8° C. and pH of 6.0–6.5, the solution was stirred for 60 minutes. A solution of 4-amino-2-(2-carboxyethyl)amino benzene sulfonic acid (12.14 parts) in 70 parts of water was added into the above solution. The temperature was raised to 40° C. and the pH was controlled between 6.0–6.5 stirring was continued until reaction was complete. The diazonium salt prepared from 26.76 parts of 4-(2-sulfatoethylsulfonyl)aniline was added into the above solution and the pH value was adjusted to 6.0. Upon completion of the reaction, the solution was desalted and dried to give a yellow dyestuff of the formula (6) could be obtained, $\lambda_{max}$=435 nm. The dyestuff can be used to dye hydroxy or amino containing fibers or fabrics in yellow shades, with excellent properties.

(6)

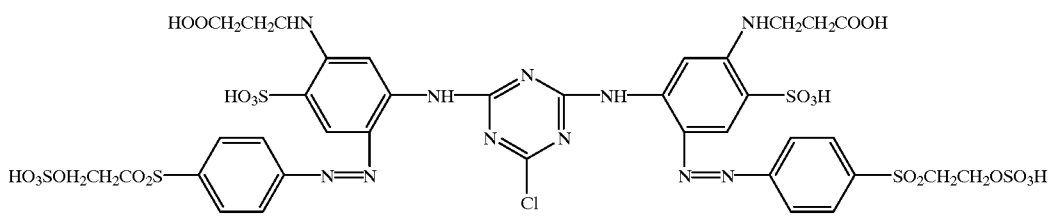

EXAMPLE 7

Cyanuric chloride (9.32 parts) was dispersed in ice water (50 parts), then a solution of 1-amino-8-naphthol-3,6-disulfonic acid (15.97 parts) in 60 parts of water was added. The reaction was controlled at 6–8° C. until the reaction was complete. The diazonium salt prepared from 13.77 parts of 4-(2-sulfoethylsulfonyl) aniline was added to the above solution and the pH value was adjusted to 6.0, then stirred until reaction was complete. 4-Amino-2-(2-carboxyethyl) amino benzene sulfonic acid (12.74 parts) was added to the above solution. The reaction temperature was raised to 40° C. and the pH was controlled between 6.0–6.5 with stirring until reaction was complete, the solution was then cooled to 5–10° C. The diazonium salt prepared from 14.05 parts of 4-(2-sulfatoethylsulfonyl) aniline was added to the above solution and the pH value was adjusted to 5.5–6.0. Upon completion of the reaction, the solution was desalinated and water removed to leave a peach red dyestuff of the formula (6), $\lambda_{max}$=502 nm. The dyestuff can be used to dye cellulose fibers in peach red shades, with excellent properties.

(5)

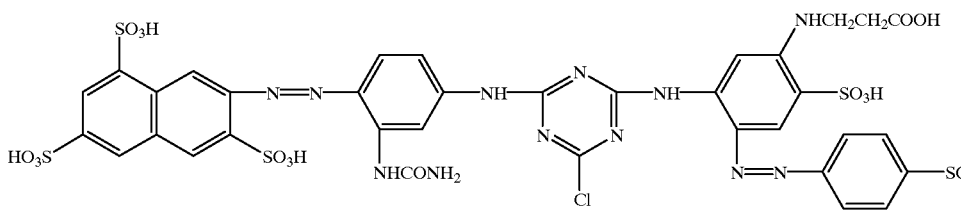

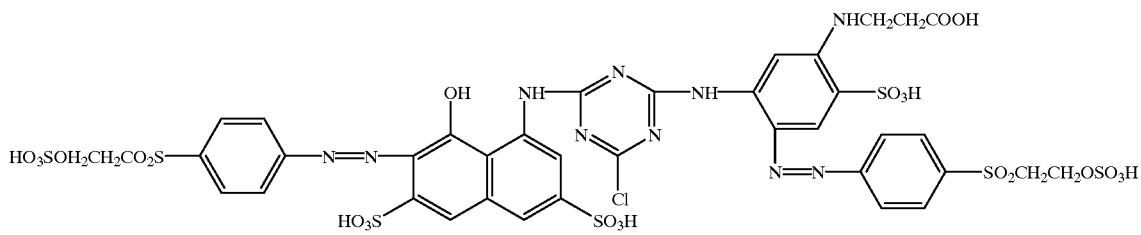

(7)

EXAMPLE 8

1-amino-8-naphthol-3,6-disulfonic acid (15.96 parts) was added into 20 parts of water and the pH value was adjusted to 6.5–7.0. The temperature of the solution was controlled at 5° C., then 7.13 parts of acetic anhydride was added. The solution was stirred until reaction was complete.

The diazonium salt prepared from 11.16 parts of 2-aminonaphthalene-sulfonic acids was added to the above solution and the pH value was controlled between 7.8–8.2, then stirred until reaction was complete. After completion the pH was raised to 12 to 13 with sodium hydroxide solution and then stirred at 76° C. until deacetylation was complete. On cooling sodium chloride (50 parts) was added with stirring and the pH was adjusted to 7.0. The resulting precipitated solid was collected, dissolved in water (1000 parts) and added to suspension of 9.1 parts cyanuric chloride in 30 parts of ice water. The pH value was controlled between 6.5–7.0 and the temperature was controlled between 5–8° C. until reaction was complete. 4-Amino-2-(2-carboxy ethyl) amino benzene sulfonic acid (11.01 parts) was added to the above solution. The temperature was raised to 35–40° C. and the pH value was controlled between 7.0–8.0 until reaction was complete.

The diazonium salt solution of prepared from 11.94 parts of 4-(2-sulfatoethylsulfonyl) aniline in 200 parts of ice water was added to the above solution. The pH value was controlled between 5.5–6.0 until completion of the reaction. The resulting solution was desalted and dried to give a red dyestuff of formula (8), $\lambda_{max}$=514 nm. The dyestuff can be used to dye objects in red, with excellent properties.

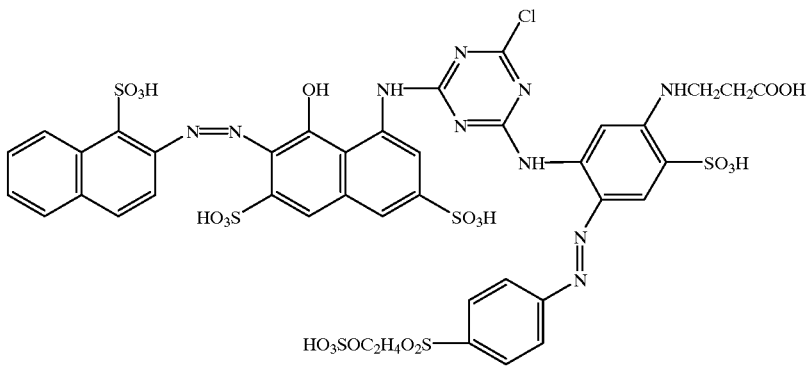

(8)

EXAMPLES 9–11

The following dyestuffs could be obtained by a procedure similar to that used to prepare compounds of Example 1–2

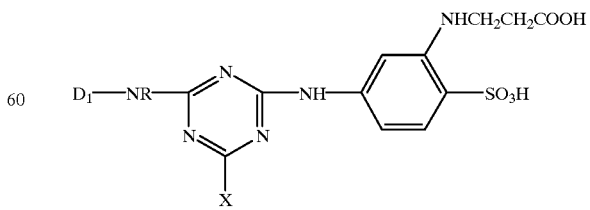

wherein $D_1$, R and X are defined as the table 1.

TABLE 1

| Example | D₁—NMR | X |
|---|---|---|
| 9 | (naphthalene with SO₃H at position 1, SO₃H at 3, HO₃S at 6, azo-linked to phenyl bearing NH₂ and NHCONH₂) | Cl |
| 10 | (naphthalene with SO₃H at position 1, SO₃H at 3, HO₃S at 6, azo-linked to phenyl bearing NH₂ and NHCONH₂) | F |
| 11 | HO₃SOH₂CH₂CO₂S—(phenyl)—N=N—(naphthalene with OH, NH₂, HO₃S, SO₃H) | Cl |

EXAMPLES 12–18

The following dyestuffs could be obtained by a procedure similar to that used to prepare compounds of Example 3–4.

(structure: benzene ring substituted with NHCH₂CH₂COOH, H₂N, SO₃H, and N=N—Z₁)

wherein $Z_1$ is defined as the table 2.

TABLE 2

| Example | Z₁—NH₂ |
|---|---|
| 12 | HO₃SOH₂CH₂CO₂S—(phenyl with OCH₃, NH₂, H₃CO) |
| 13 | HO₃SOH₂CH₂CO₂S—(phenyl with CH₃, NH₂, H₃CO) |
| 14 | HO₃SOH₂CH₂CO₂S—(phenyl with OCH₃, NH₂) |
| 15 | HO₃SOH₂CH₂CO₂S—(phenyl with SO₃H, NH₂) |

TABLE 2-continued
| Example | $Z_1-NH_2$ |
|---------|------------|
| 16 | 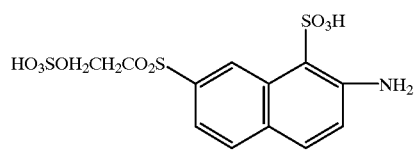 |
| 17 | |
| 18 | 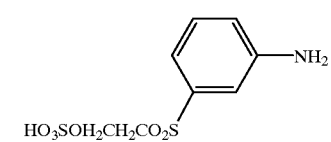 |
EXAMPLE 19–94
The following dyestuffs could be obtained by a procedure similar to that used to prepare the materials of Example 5 TO 8.
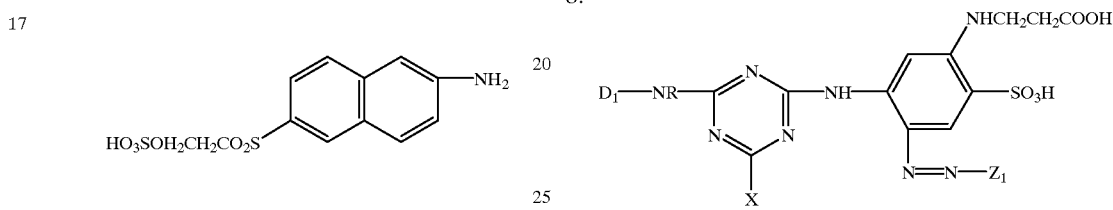
Wherein $D_1$, R, X and $Z_1$ are defined as the table 3.

TABLE 3

| Example | $D_1$—NHR | X | $Z_1$—$NH_2$ |
|---|---|---|---|
| 19 | 8-amino-1-hydroxy-naphthalene-3,6-disulfonic acid coupled via azo to naphthalene-1,5-disulfonic acid substituent (HO$_3$S, SO$_3$H groups); structure with NH$_2$, OH, SO$_3$H, HO$_3$S on naphthalene rings joined by N=N | Cl | 4-aminophenyl—SO$_2$CH$_2$CH$_2$OSO$_3$H |
| 20 | 2-amino-4-(ureido)phenyl—N=N—naphthalene bearing SO$_3$H, HO$_3$S, SO$_3$H substituents | Cl | 3-aminophenyl—SO$_2$CH$_2$CH$_2$OSO$_3$H |
| 21 | 2-amino-4-(ureido)phenyl—N=N—naphthalene bearing SO$_3$H, HO$_3$S, SO$_3$H substituents | N-methylmorpholine | 4-aminophenyl—SO$_2$CH$_2$CH$_2$OSO$_3$H |
| 22 | 5-amino-2-sulfophenyl—N=N—pyridone (1-ethyl-3-carbamoyl-4-methyl-6-hydroxy-2-oxo) | Cl | 4-aminophenyl—CONH(CH$_2$)$_2$SO$_2$(CH$_2$)$_2$OSO$_3$H |

TABLE 3-continued

| Example | $D_1$—NHR | X | $Z_1$—$NH_2$ |
|---|---|---|---|
| 23 | pyridone dye structure with $CH_3$, $C(O)NH_2$, N-$C_2H_5$, OH, linked via N=N to phenyl bearing $SO_3H$, $HO_3S$, $NH_2$ | Cl | 4-aminophenyl-$SO_2CH_2CH_2OSO_3H$ |
| 24 | pyridone dye structure with $CH_3$, $HO_3S$-$H_2C$, N-$C_2H_5$, OH, linked via N=N to phenyl bearing $HO_3S$, $NH_2$ | F | 4-aminophenyl-$SO_2CH_2CH_2OSO_3H$ |
| 25 | phenyl with $NH_2$, $NHCONH_2$, N=N-phenyl with $SO_3H$, $HO_3S$ | F | 3-aminophenyl-$CONH(CH_2)SO_2(CH_2)_2OSO_3H$ |
| 26 | phenyl with $NH_2$, $NHCOCH_3$, N=N-naphthyl with $SO_3H$, $SO_3H$ | Cl | 4-aminophenyl-$SO_2CH_2CH_2OSO_3H$ |

TABLE 3-continued

| Example | $D_1$—NHR | X | $Z_1$—$NH_2$ |
|---|---|---|---|
| 27 | (naphthalene with SO₃H groups linked via N=N to phenyl-N=N-phenyl-NH₂) | Cl | 4-aminophenyl-SO₂CH₂CH₂OSO₃H |
| 28 | (copper complex azo structure with SO₃H, carboxylate, and 2-sulfophenyl groups) | F | 4-aminophenyl-SO₂CH₂CH₂OSO₃H |
| 29 | (naphthalene-diamine-disulfonic acid with two azo linkages to sulfophenyl-SO₂CH₂CH₂CO₂H and 2-sulfo-5-amino-phenyl) | Cl | 2,4-diamino-benzenesulfonic acid (HO₃S, H₂N, NH₂); 4-aminophenyl-SO₂CH₂CH₂OSO₃H |
| 30 | (6-amino-1-hydroxy-naphthalene with azo linkage to 2-sulfo-4-methyl-5-sulfo-phenyl and HO₃S group) | | 4-aminophenyl-SO₂CH₂CH₂OSO₃H; 4-aminophenyl-SO₂CH₂CH₂OSO₃H |

TABLE 3-continued

| Example | D₁—NHR | X | Z₁—NH₂ |
|---------|--------|---|--------|
| 31 | 4-amino-5-hydroxy-naphthalene-2,7-disulfonic acid coupled with 2-sulfo-4-sulfophenyl (azo) | Cl | 4-amino-phenyl-SO₂CH₂CH₂OSO₃H |
| 32 | 2-amino-5-sulfo-phenyl azo-(4-(2-sulfatoethylsulfonyl)phenyl), with NH₂ | OH | 4-amino-phenyl-SO₂CH₂CH₂OSO₃H |
| 33 | 8-amino-7-hydroxy-naphthalene-3-sulfonic acid, bis-azo coupled derivative with NHCOCH₃ and O(CH₂)₂OSO₃H substituents | Cl | 4-amino-phenyl-SO₂CH₂CH₂OSO₃H |
| 34 | 1,5-disulfo-naphthalene-azo-(2-amino-3-methoxy-5-acetamido-phenyl-OCH₃) | Cl | 4-amino-phenyl-SO₂CH₂CH₂OSO₃H |

TABLE 3-continued

| Example | D₁—NHR | X | Z₁—NH₂ |
|---|---|---|---|
| 35 | (naphthalene trisulfonic acid azo-tolyl-azo-aniline structure) | Cl | 3-amino-2,5-benzenedisulfonic acid |
| 36 | (4-amino-5-hydroxy-naphthalenesulfonic acid azo-phenyl-SO₂CH₂CH₂OSO₃H) | Cl | (aminobenzene-azo-sulfobenzene structure with SO₃H) |
| 37 | (chromium/cobalt complex azo structure with NH₂, SO₃H, phenyl) | F | 4-aminophenyl-SO₂CH₂CH₂OSO₃H |
| 38 | (bis-azo naphthalene structure with multiple SO₃H, OH, NH₂ groups) | Cl | 4-amino-2-(sulfophenylazo)-phenyl SO₂CH₂CH₂OSO₃H |

TABLE 3-continued

| Example | D₁—NHR | X | Z₁—NH₂ |
|---|---|---|---|
| 39 | naphthalene with OH, NHCH₃, HO₃S, azo to phenyl-SO₃H | 4-aminophenyl-SO₂CH₂CH₂OSO₃H | 4-aminophenyl-SO₂CH₂CH₂OSO₃H |
| 40 | naphthalene with NH₂, OH, SO₃H, azo to phenyl(SO₃H)(SO₃H) | F | 4-aminophenyl-SO₂CH₂CH₂OSO₃H |
| 41 | naphthalene with NH₂, OH, SO₃H, azo to phenyl(SO₃H)(SO₃H) | F | 3-aminophenyl-SO₂CH₂CH₂OSO₃H |
| 42 | naphthalene with NH₂, OH, SO₃H, SO₃H, azo to phenyl(NHCOCH₃)(O(CH₂)₂OSO₃H), azo to phenyl(SO₃H)(SO₃H) | Cl | 4-aminophenyl-SO₂CH₂CH₂OSO₃H |

TABLE 3-continued

| Example | D₁—NHR | X | Z₁—NH₂ |
|---|---|---|---|
| 43 | (structure: aminonaphthalene-disulfonic acid azo-coupled to acetamido-aminobenzene) | Cl | 4-(2-sulfatoethylsulfonyl)aniline |
| 44 | (structure: 1-hydroxy-6-amino-naphthalene-sulfonic acid azo-coupled to methoxy-sulfo-benzene) | F | 4-(2-sulfatoethylsulfonyl)aniline |
| 45 | (structure: 8-propionamido-1-hydroxy-naphthalene-disulfonic acid azo-coupled to amino-sulfo-benzene) | Cl | 4-(2-sulfatoethylsulfonyl)aniline |
| 46 | (pyrazolone structure with HOOC, OH, N-phenyl-SO₃H, azo-coupled to amino-sulfo-benzene) | F | 2-sulfo-4-(2-sulfatoethylsulfonyl)aniline |

TABLE 3-continued

| Example | D₁—NHR | X | Z₁—NH₂ |
|---|---|---|---|
| 47 | (structure: aminobenzene-SO₃H fused with boron chelate, phenyl-azo, HO₃S-naphthalene-NH₂) | Cl | 2-amino-5-CONH(CH₂)₂SO₂(CH₂)₂OSO₃H benzene-SO₃H |
| 48 | (structure: HO₃S-phenyl-N=N-naphthalene(OH, NH₂, 2×SO₃H)-N=N-naphthalene(SO₃H, SO₃H) with NH₂-phenyl) | F | 4-NH₂-phenyl-SO₂CH₂CH₂OSO₃H; 4-NH₂-phenyl-SO₂CH₂CH₂OSO₃H; 4-NH₂-phenyl-SO₂CH₂CH₂OSO₃H |
| 49 | (structure: 6-amino-1-hydroxy-naphthalene-2-(N=N)-phenyl(SO₃H, OCH₃) with SO₃H) | | 4-NH₂-phenyl-SO₂CH₂CH₂OSO₃H |

TABLE 3-continued

| Example | $D_1$—NHR | X | $Z_1$—$NH_2$ |
|---|---|---|---|
| 50 | Naphthalene with $NH_2$, OH, $SO_3H$, $HO_3S$ substituents, azo-linked to benzene with $SO_3H$ and $H_3CO$ | Cl | aniline with $SO_2CH_2CH_2OSO_3H$ (meta) |
| 51 | Naphthalene with $NH_2$, OH, $SO_3H$, azo-linked to benzene with $O(CH_2)_2OH$, $CH_3$, and further azo-linked to benzene with $HO_3S$ | Cl | aniline with $SO_2CH_2CH_2OSO_3H$ (para) |
| 52 | Naphthalene with $NH_2$, OH, $HO_3S$, azo-linked to benzene with $SO_3H$ | Cl | aniline with $SO_2CH_2CH_2OSO_3H$ (para) |
| 53 | Naphthalene with $NH$—$CH_3$, OH, $HO_3S$, azo-linked to benzene with $SO_3H$ and $H_3CO$ | Cl | aniline with $CONH(CH_2)SO_2(CH_2)OSO_3H$ |

TABLE 3-continued

| Example | $D_1$—NHR | X | $Z_1$—$NH_2$ |
|---|---|---|---|
| 54 | (naphthalene with SO₃H groups, azo-linked to phenyl ring bearing NH₂ and NHCONH₂) | Cl | (3-amino-4-sulfophenyl)amino-triazinyl-Cl with NH-phenyl-SO₂CH₂CH₂OSO₃H |
| 55 | (8-amino-1-hydroxy-naphthalene-3,6-disulfonic acid azo-coupled to 1-sulfo-2-naphthyl) | Cl | 2-amino-5-[CONH(CH₂)SO₂(CH₂)₂OSO₃H]-benzenesulfonic acid |
| 56 | (1-amino-2-sulfo-4-[(4-amino-3-sulfophenyl)amino]anthraquinone) | Cl | 4-amino-phenyl-SO₂CH₂CH₂OSO₃H |

TABLE 3-continued

| Example | D₁—NHR | X | Z₁—NH₂ |
|---|---|---|---|
| 57 | naphthalene with NH₂, OH, SO₃H, HO₃S groups azo-linked to phenol bearing OH and O₂N (½ Cr complex, Cl) | 4-aminophenyl-SO₂CH₂CH₂OSO₃H | |
| 58 | naphthalene with NH₂, OH, SO₃H groups azo-linked to phenyl-CO₂CH₂CH₂OSO₃H | 4-aminophenyl-SO₂CH₂CH₂OSO₃H | 4-aminophenyl-SO₂CH₂CH₂OSO₃H |
| 59 | naphthalene with NH₂, OH, SO₃H, HO₃S groups azo-linked to naphthyl with SO₃H | Cl | 4-aminophenyl-SO₂CH₂CH₂OSO₃H |
| 60 | naphthalene with NH₂, OH, SO₃H, HO₃S, SO₃H groups azo-linked to phenyl with HO₃S | F | 4-aminophenyl-CONH(CH₂)₃SO₂(CH₂)₂OSO₃H |

TABLE 3-continued

| Example | $D_1-NHR$ | X | $Z_1-NH_2$ |
|---------|-----------|---|------------|
| 61 | (naphthalene with OH, $NH_2$, $HO_3S$, azo-linked to phenyl bearing $O(CH_2)_2OH$, $CH_3$, azo-linked to phenyl with $SO_3H$ and $HO_3S$) | Cl | 4-aminophenyl-$SO_2CH_2CH_2OSO_3H$ |
| 62 | (naphthalene with OH, $NH_2$, $HO_3S$, azo-linked to phenyl with $SO_3H$ and $HO_3S$) | Cl | 2-amino-phenyl with $SO_3H$ and $SO_2(CH_2)_2OSO_3H$ |
| 63 | (naphthalene with $SO_3H$, $NH_2$, OH, $HO_3S$, azo-linked to phenyl-$SCO_2CH_2SO_3H$) | Cl | triazine (Cl) linked via NH to aminophenyl-$SO_3H$ and NH to phenyl-$SO_2CH_2CH_2OSO_3H$ |

TABLE 3-continued

| Example | $D_1$—NHR | X | $Z_1$—$NH_2$ |
|---|---|---|---|
| 64 | (naphthalene azo benzene structure with OH, $NH_2$, $HO_3S$, $SO_3H$, $H_3CO$ substituents) | F | 4-$NH_2$-C$_6$H$_4$-$SO_2CH_2CH_2OSO_3H$ |
| 65 | (naphthalene azo naphthalene structure with OH, $NH_2$, $SO_3H$ substituents) | F | 4-$NH_2$-C$_6$H$_4$-$SO_2CH_2CH_2OSO_3H$ |
| 66 | (anthraquinone structure with $NH_2$, $SO_3H$, NH-aryl substituents) | HN(CH$_2$CH$_2$OH)$_2$ | 4-$NH_2$-C$_6$H$_4$-$SO_2CH_2CH_2OSO_3H$ |

TABLE 3-continued

| Example | D₁—NHR | X | Z₁—NH₂ |
|---|---|---|---|
| 67 | [Ni phthalocyanine with SO₃H$_x$, SO₂NH₂$_y$, SO₂NHCH₂CH₂NH– substituents; x + y = 2–3, z = 1–2] | F | 4-aminophenyl-SO₂CH₂CH₂OSO₃H |
| 68 | [naphthalene with NH₂, OH, SO₃H, azo-phenyl-SO₂CH₂CO₂CH₂SO₃H substituents] | 4-aminophenyl-SO₂CH₂CH₂OSO₃H | 2-amino-4-sulfo-phenyl (NH₂, SO₃H) |
| 69 | [naphthalene with NH₂, OH, SO₃H, azo-naphthalene-SO₃H substituents] | Cl | 4-aminophenyl-SO₂CH₂CH₂OSO₃H |

TABLE 3-continued

| Example | D₁—NHR | X | Z₁—NH₂ |
|---|---|---|---|
| 70 | [naphthalene with NH₂, OH, SO₃H, HO₃S, azo-linked to phenyl-SO₂CH₂CH₂OSO₃H] | Cl | [aniline with CONH(CH₂)₃SO₂(CH₂)₂OSO₃H] |
| 71 | [naphthalene with NH₂, OH, HO₃S, azo-linked to phenyl with SO₃H, CH₃, HO₃S] | F | [aniline with SO₂CH₂CH₂OSO₃H] |
| 72 | [naphthalene with NH₂, OH, SO₃H, HO₃S, azo-linked to phenyl] | Cl | [aniline with SO₂CH₂CH₂OSO₃H] |
| 73 | [naphthalene with NH₂, OH, SO₃H, HO₃S, azo-linked to naphthalene with SO₂CH₂CH₂OSO₃H] | [aniline with SO₃H] | [aniline with SO₂CH₂CH₂OSO₃H] |

TABLE 3-continued

| Example | D₁—NHR | X | Z₁—NH₂ |
|---|---|---|---|
| 74 | 1-amino-2-sulfo-4-[(3-amino-2-methyl-5-sulfophenyl)amino]anthraquinone | Cl | 4-(2-sulfatoethylsulfonyl)aniline |
| 75 | copper phthalocyanine with (SO₃H)ₓ, (SO₂NH₂)_y, and SO₂NH-(3-aminophenyl)_z substituents; x + y = 2–3, z = 1–2 | Cl | 4-(2-sulfatoethylsulfonyl)aniline |
| 76 | 8-amino-1-hydroxy-2-[(2-sulfophenyl)azo]naphthalene-3,6-disulfonic acid | 4-(2-sulfatoethylsulfonyl)aniline | 4-(2-sulfatoethylsulfonyl)aniline |

TABLE 3-continued

| Example | D$_1$—NHR | X | Z$_1$—NH$_2$ |
|---------|-----------|---|--------------|
| 77 | (complex boron chelate azo structure with NH$_2$, HO$_3$S, SO$_3$H, phenyl substituents) | Cl | 4-aminophenyl–SO$_2$CH$_2$CH$_2$OSO$_3$H |
| 78 | (1-amino-8-hydroxynaphthalene-based bisazo with SO$_3$H groups, coupled to naphthalene with SO$_3$H) | Cl | 4-aminophenyl–CONH(CH$_2$)$_2$SO$_2$(CH$_2$)$_2$OSO$_3$H |
| 79 | (1-hydroxy-6-(methylamino)naphthalene azo to 2-sulfophenyl with SO$_3$H) | Cl | 4-amino-3-sulfophenyl–CONH(CH$_2$)$_2$SO$_2$(CH$_2$)$_2$OSO$_3$H |
| 80 | (1-amino-8-hydroxynaphthalene-3,6-disulfonic acid azo to 2-sulfophenyl) | F | 4-aminophenyl–SO$_2$CH$_2$CH$_2$OSO$_3$H |

TABLE 3-continued

| Example | D₁—NHR | X | Z₁—NH₂ |
|---|---|---|---|
| 81 | Naphthylazo-naphthalene with NH₂, OH, SO₃H, HO₃S, HO₃SOCH₂CH₂O₂S substituents | F | 4-aminophenyl-CONH(CH₂)₂SO₂(CH₂)₂OSO₃H |
| 82 | 1-amino-4-hydroxy-anthraquinone-NH-(2,6-dimethyl-3-amino-4-methyl-5-sulfo)phenyl | F | 4-H₂N-C₆H₄-SO₂CH₂CH₂OSO₃H |
| 83 | (2,4-diamino-ureido-phenyl)azo-naphthalene-SO₃H, SO₃H, HO₃S | 4-H₂N-C₆H₄-SO₂CH₂CH₂OSO₃H | 4-H₂N-C₆H₄-SO₂CH₂CH₂OSO₃H |
| 84 | Naphthyl(SO₃H,SO₃H)-azo-naphthalene(NH₂, OH, HO₃S, SO₃H) | 4-H₂N-C₆H₄-SO₂CH₂CH₂OSO₃H | 4-H₂N-C₆H₄-SO₂CH₂CH₂OSO₃H |

TABLE 3-continued

| Example | $D_1$—NHR | X | $Z_1$—$NH_2$ |
|---|---|---|---|
| 85 | 4-amino-5-hydroxy-naphthalene-2,7-disulfonic acid coupled with 2-sulfo-4-methoxyphenyl diazo | 3-aminophenyl-SO$_2$CH$_2$CH$_2$OSO$_3$H | 4-aminophenyl-SO$_2$CH$_2$CH$_2$OSO$_3$H |
| 86 | 8-amino-1-hydroxy-naphthalene-3,6-disulfonic acid coupled with 1-sulfo-5-sulfonaphth-2-yl diazo | F | 3-aminophenyl-CONH(CH$_2$)$_2$SO$_2$(CH$_2$)$_2$OSO$_3$H |
| 87 | 6-amino-1-hydroxy-2-(4-(2-sulfatoethylsulfonyl)phenylazo)naphthalene-3-sulfonic acid | N-methylmorpholino | 2-amino-4-sulfophenyl |
| 88 | 8-amino-1-hydroxy-2-(4-carboxyphenylazo)naphthalene-3,6-disulfonic acid | Cl | 3-aminophenyl-CONH(CH$_2$)$_2$SO$_2$(CH$_2$)$_2$OSO$_3$H |

TABLE 3-continued

| Example | D₁—NHR | X | Z₁—NH₂ |
|---|---|---|---|
| 89 | (naphthalene-naphthalene bis-azo structure with NH₂, OH, SO₃H, HO₃S, HO₃SOH₂CH₂CO₂S substituents) | Cl | (aminobenzene-azo-benzenesulfonic acid structure with NH₂, SO₃H, SO₃H) |
| 90 | (naphthalene bis-azo structure with OH, NH₂, HO₃S, SO₃H, and phenyl-SO₃H substituents) | F | $H_2N$—⬡—$SO_2CH_2CH_2OSO_3H$ |
| 91 | (aminoacetanilide-azo-naphthalene disulfonic acid structure with NH₂, NHCOCH₃, SO₃H) | $H_2N$—⬡—$SO_2CH_2CH_2OSO_3H$ | $H_2N$—⬡—$SO_2CH_2CH_2OSO_3H$ |
| 92 | (naphthalene-azo-aminobenzene structure with NHCOCH₂CH₃, OH, SO₃H, HO₃S, SO₃H, H₂N substituents) | $H_2N$—⬡—$SO_2CH_2CH_2OSO_3H$ | $H_2N$—⬡—$SO_2CH_2CH_2OSO_3H$ |

TABLE 3-continued

| Example | D₁—NHR | X | Z₁—NH₂ |
|---------|--------|---|--------|
| 93 | (naphthalene with OH, NH₂, SO₃H, HO₃S substituents azo-linked to benzene with OCH₃ and H₃COCHN, azo-linked to naphthalene with SO₃H, SO₃H) | Cl | 4-aminophenyl-SO₂CH₂CH₂OSO₃H (NH₂ para) |
| 94 | (copper complex: benzene-COO−Cu−O−benzene with SO₃H, NH₂, HO₃S, N=N, N=N, phenyl) | Cl | 3-aminophenyl-SO₂CH₂CH₂OSO₃H |

EXAMPLE 95

Put urea, 100 parts, m-nitrobenzene sulfonic acid sodium salt, 10 parts, sodium bicarbonate, 20 parts, sodium alginate, 55 parts and warm water, 815 parts, into a vessel, then stir to get a completely homogeneous printing paste.

Take the dyestuff of the formula (1) (prepared from the example 1), 3 parts, and the above printing paste, 100 parts, mixed together to make a homogeneous color paste. Put 100 mesh printing screen cover on an adequate size full cotton fabric, then paint color paste on printing screen to get a color fabric.

Put colored fabric into an oven at 65° C. to dry 5 minutes, take out dried colored fabric, put into steam oven using saturated steam for 10 minutes at 102–105° C.

The colored fabric is washed with cold water, hot water, and soap wash then dried to obtain an orange fabric with good properties of build-up and wet fastness.

EXAMPLE 96

Put urea 100 parts, m-nitrobenzene sulfonic acid sodium salt, 10 parts, sodium bicarbonate, 20 parts, sodium alginate, 55 parts, warm water, 815 parts, into a vessel, then stir to get a completely homogeneous printing paste.

Take dyestuff of the formula (2) (prepared from the example 2), 3 parts, and the above printing paste, 100 parts, mixed together to make a homogeneous color paste. Put 100 mesh printing screen cover on an adequate size full cotton fabric, then paint color paste on printing screen to get a color fabric.

Put colored fabric into an oven at 65° C. to dry 5 minutes, take out dried color fabric, put into steam oven using saturated steam for 10 minutes at 102–105° C.

The colored fabric was washed with cold water, hot water, and soap wash then dried to obtain a rose red fabric with good properties of build-up and wet fastness.

EXAMPLE 97

Take dyestuff of the formula (3) (prepared from the example 3), 3 parts, in 100 parts of water to give a padding liquor. 25 ml of alkali solution (NaOH (38° Be') 15 ml/l and Glauber's salt 30 parts/l) were added to the padding liquor. The resultant solution was put into a pad roller machine. The cotton fabric was padded by the roller pad machine, then was batched for 4 hours. The padded fabric was washed with cold water, hot water, and soap wash then dried to obtain an orange fabric with good properties of build-up and wet fastness.

EXAMPLE 98

Take dyestuff of the formula (4) (prepared from the example 4), 3 parts in 100 parts of water to give a padding liquor. 25 ml of alkali solution (NaOH (38° Be') 15 ml/l and Glauber's salt 30 parts/l) were added into padding liquor. The resultant mixture solution was put into a pad roller machine. The cotton fabric was padded by the roller pad machine, then was batched for 4 hours. The padded fabric was washed with cold water, hot water, and soap solution then dried to obtain an orange fabric with good properties of build-up and wet fastness.

EXAMPLE 99

Take dyestuff of the formula (5) (prepared from the example 5) 0.25 parts, in 250 parts of water to a solution. Take 40 ml of this solution in dyeing bottle, then put a cotton fabric into the dyeing bottle. Add Glauber's salt, 2.4 parts, and 32% alkali solution, 2.5 parts, to the dyeing bottle. The dyeing bottle is shaken at 60° C. for 60 minutes. The colored fabric was washed with cold water, hot water, and soap solution then dried to obtain a yellow fabric with good properties of build-up, wet fastness and wash fastness.

EXAMPLE 100

Take dyestuff of the formula (6) (prepared from the example 6), 0.25 parts in 250 parts of water to give solution. Take 40 ml of this solution in a dyeing bottle, then put a cotton fabric into the dyeing bottle. Add Glauber's salt, 2.4 parts, and 32% alkali solution, 2.5 parts, to the dyeing bottle. The dyeing bottle was shaken at 60° C. for 60 minutes. The colored fabric was washed with cold water, hot water, and soap solution then dried to obtain a yellow fabric with good properties of build-up, wet fastness and wash fastness.

EXAMPLE 101

Take dyestuff of the formula (7) (prepared from the example 7), 0.25 parts, in 250 parts of water. Take 40 ml of solution in a dyeing bottle, then put a cotton fabric into the dyeing bottle. Add Glauber's salt, 2.4 parts, and 32% alkali solution, 2.5 parts to the dyeing bottle. The dyeing bottle was shaken at 60° C. for 60 minutes. The colored fabric was washed with cold water, hot water, and soap solution then dried to obtain a peach red fabric with good properties of build-up, wet fastness and wash fastness.

EXAMPLE 102

Take dyestuff of the formula (7) (prepared from the example 7), 0.25 parts, in 250 parts of water. Take 40 ml of this solution in a dyeing bottle, then put a cotton fabric into the dyeing bottle. Add Glauber's salt, 2.4 parts and 32% alkali solution, 2.5 parts, to the dyeing bottle. The dyeing bottle was shaken at 60° C. for 60 minutes. The colored fabric was washed with cold water, hot water, and soap solution then dried to obtain a peach red fabric with good properties of build-up, wet fastness and wash fastness.

From the foregoing description, one skilled in the art can easily ascertain the essential characteristics of this invention, and without departing from the scope thereof, can make various changes and modifications of the invention to adapt it to various usages and conditions. Thus, other embodiments are also within the claims.

What is claimed is:

1. A fiber reactive dyestuff of the formula (I):

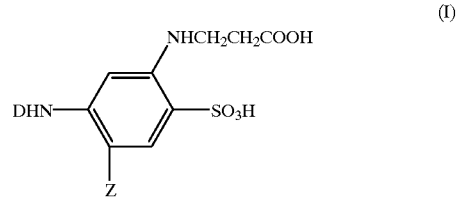

wherein:

Z is hydrogen atom or —N=N—$Z_1$, wherein $Z_1$ is:

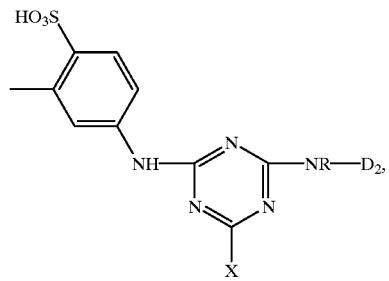

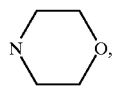

wherein X is fluorine atom, chlorine atom, carboxypyridinium, hydroxyl, $C_{1-4}$ alkoxyl, —NHCN, N,N-di-β-hydroxyethylamino, or phenylamino which is substituted by —$SO_2(CH_2)_2OSO_3H$, $SO_3H$, Cl, COOH, $C_{1-4}$ alkyl, or $C_{1-4}$ alkoxyl;

Y is —OH, —$CH_2$=$CH_2$ or —$CH_2$—$CH_2$—W, W is a leaving group which is eliminable by a base;

I is —$SO_3H$, $C_{1-4}$ alkoxyl or $C_{1-4}$ alkoxycarbonyl;

p is 0, 1, 2, or 3;

Q is —$SO_2$—Y, —CONH—$(CH_2)_n$—$SO_2$—Y, —O—$(CH_2)_m$—CONH—$(CH_2)_n$—$SO_2$—Y, or —NH—CO—T, wherein Y is defined as the above, T is α,β-halopropionyl or α-halocryloyl, m and n each independent is 1, 2, 3, 4, 5, or 6;

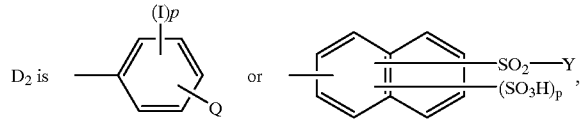

wherein I, p, Q, and Y are defined as the above;

R is hydrogen atom, $C_{1-4}$ alkyl, or $C_{1-4}$ alkyl which is substituted by halogen atom, hydroxyl, cyano, $C_{1-4}$ alkoxyl, $C_{1-4}$ alkoxycarbonyl, carboxyl, sulfonyl, or sulfato;

D is hydrogen atom or

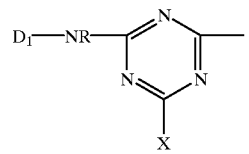

wherein X and R are defined as the above; only one of D and Z maybe a hydrogen wherein X and R are defined as the above; only one of D and Z maybe a hydrogen atom, that is, if D is hydrogen Z is —N=N—$Z_1$; if Z is hydrogen D is

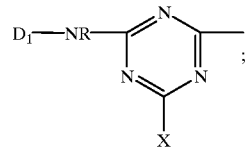

$D_1$ is a chromophore with or without reactive groups, wherein said reactive groups are selected from the above Q group, said chromophore is selected from the group consisting of formazan, anthraquinone, phthalocyanine, triphendioxazine, monoazo, poly azo, or metal complex diazo.

2. The dyestuff of claim 1, wherein said formula (I) is the following formula (II)

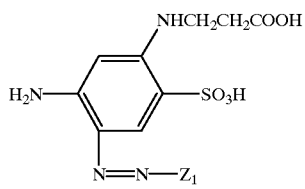

wherein $Z_1$ is defined as in claim 1.

3. The dyestuff of claim 1, wherein said formula (I) is the following formula (III)

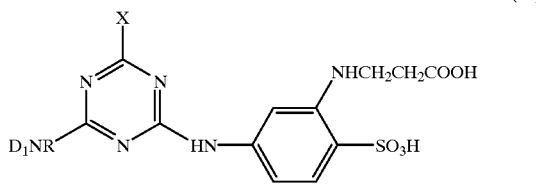

wherein X, $D_1$ and R are defined as in claim 1.

4. The dyestuff of claim 1, wherein said formula (I) is the following formula (IV)

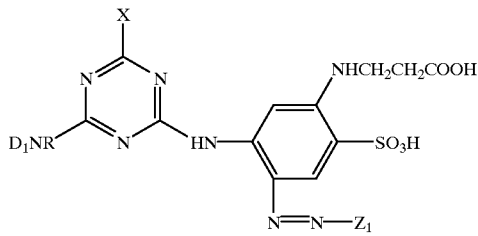

wherein X, $D_1$, $Z_1$ and R are defined as in claim 1.

5. The dyestuff of claim 1, wherein said formazan chromophore is

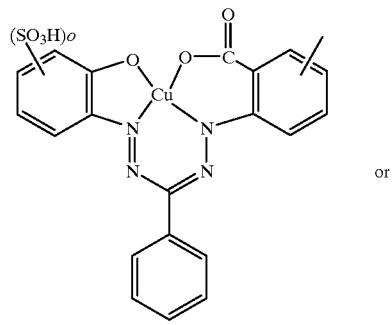

or

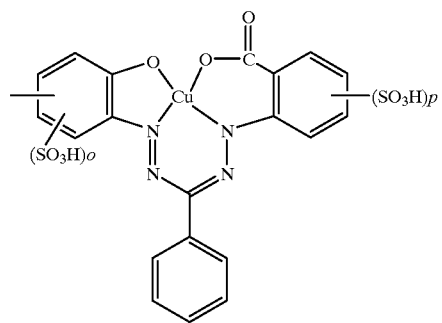

wherein p is 0, 1, 2 or 3, and o is 0, 1, 2 or 3.

6. The dyestuff of claim 1, wherein said anthraquinone is

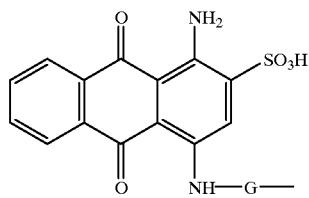

wherein G is a (cyclo) alkylene group which is substituted by $C_{1-4}$ alkyl or sulfonyl.

7. The dyestuff of claim 1, wherein said phthalocyanine is

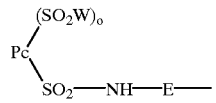

wherein Pc is copper phthalocyanine or nickel phthalocyanine; W is —OH or —$NH_2$; E is arylene or alkylene; o is 0, 1, 2, or 3.

8. The dyestuff of claim 1, wherein said triphendioxazine is

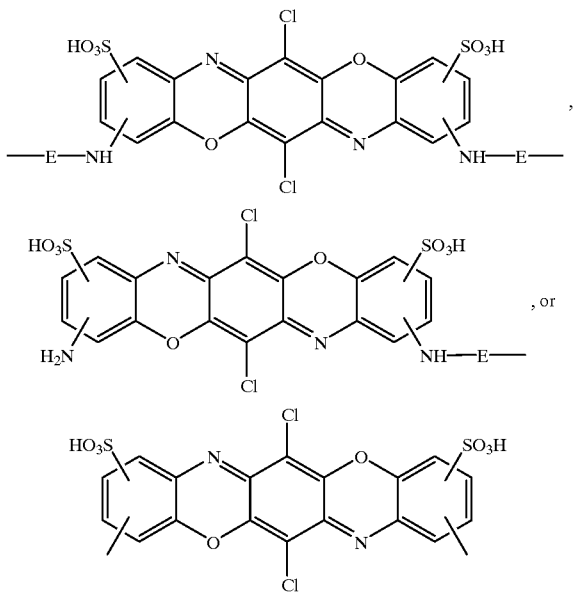

wherein E is arylene or alkylene.

9. The dyestuff of claim 1, wherein said monoazo is

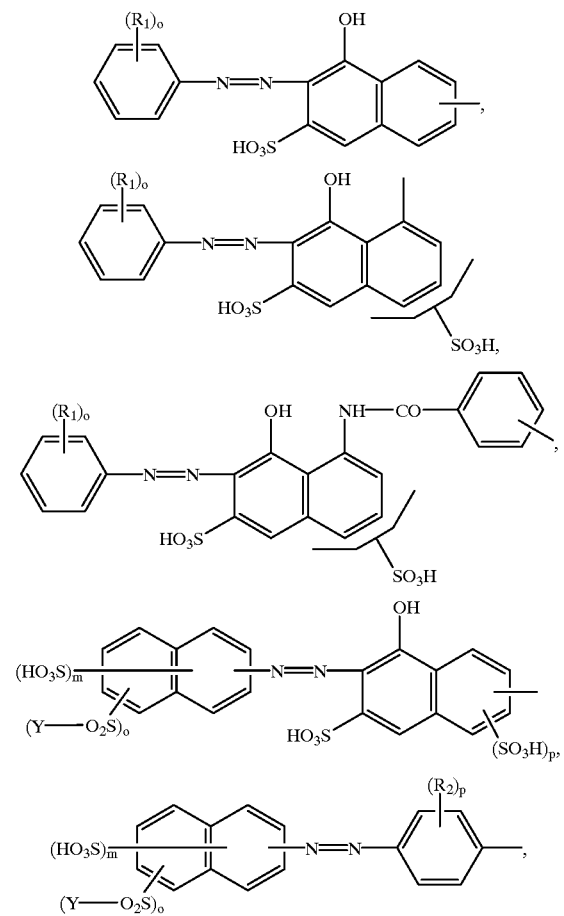

-continued

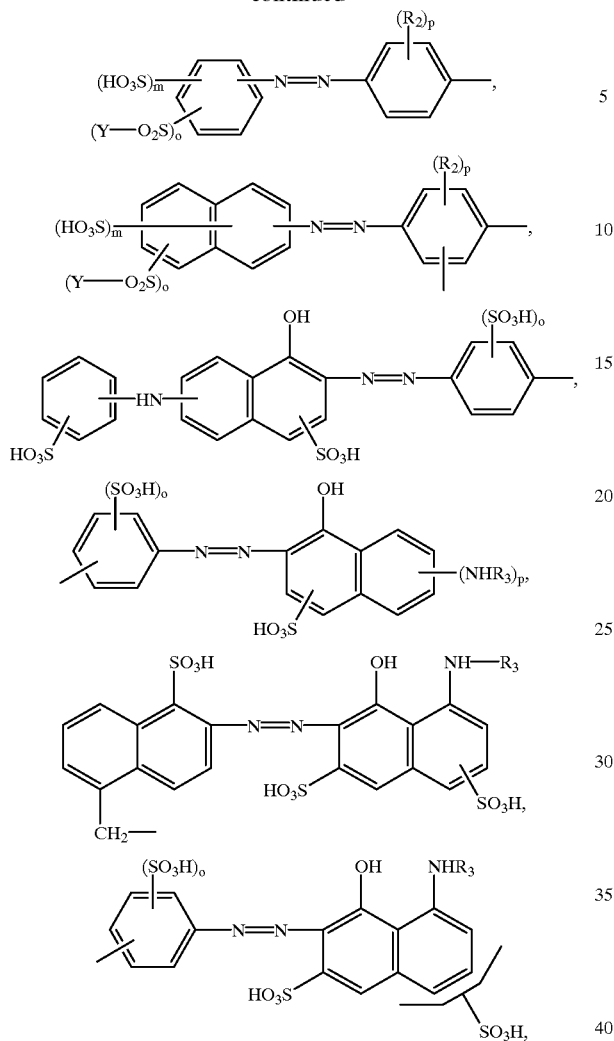

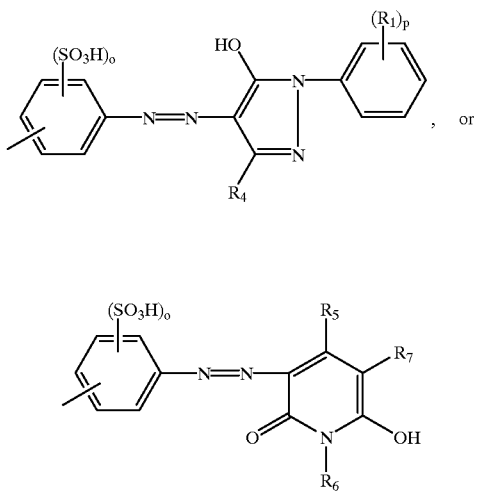

wherein

R₁ is $C_{1-4}$ alkyl, $C_{1-4}$ alkoxyl, hydroxyl, carboxyl, sulfonyl, or —SO₂—Y, Y is defined as in claim 1;

R₂ is $C_{1-4}$ alkyl, $C_{1-4}$ alkoxyl, amino, acetylamino, ureido, or sulfonyl;

R₃ is $C_{1-4}$ acyl or benzoyl;

R₄ is $C_{1-4}$ alkyl or carboxyl;

R₅ and R₆ are $C_{1-4}$ alkyl; R₇ is hydrogen, carbonamido, sulphomethyl or methyl sulfonic acid;

m, n, and p are defined as in claim 1 and o is 0, 1, 2 or 3.

10. The dyestuff of claim 1, wherein said polyazo is

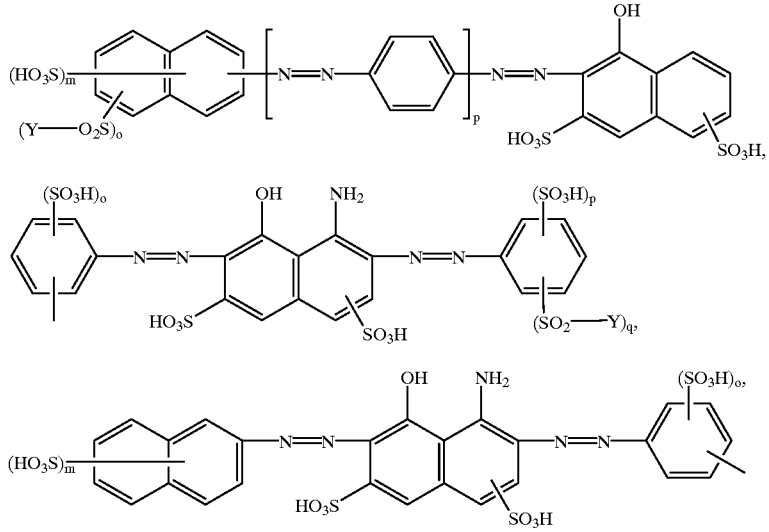

-continued

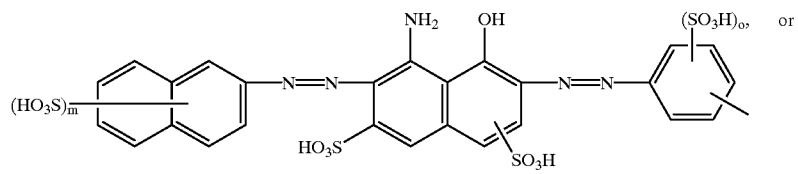

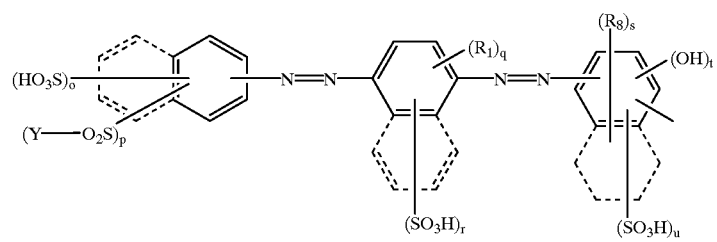

wherein $R_8$ is $C_{1-4}$ alkyl, $C_{1-4}$ alkoxyl, carboxyl, sulfonyl, acetyl, acetylamino, ureido, or —$SO_2$—Y;

q, r, s, t and u each independent is 0, 1, 2 or 3;

$R_1$ is $C_{1-4}$ alkyl, $C_{1-4}$ alkoxyl, hydroxyl, carbonyl, sulfonyl, or —$SO_2$—Y;

o is 0, 1, 2, or 3;

Y, m, n, and p are defined as in claim 1.

11. The dyestuff of claim 1, wherein said $Z_1$ is

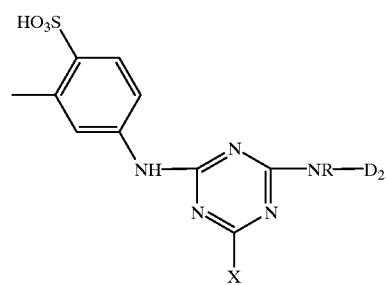

wherein $D_2$, R and X are defined as in claim 1.

12. The dyestuff of claim 11, wherein said $D_2$ is

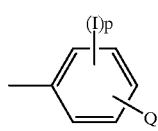

wherein I, p and Q are defined as in claim 1.

13. The dyestuff of claim 11, wherein said $D_2$ is

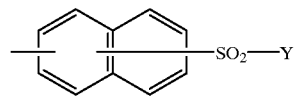

wherein Y is defined as in claim 1.

14. The dyestuff of claim 1, wherein said $Z_1$ is

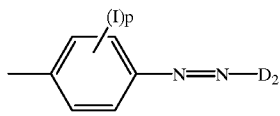

wherein $D_2$, I and p are defined as in claim 1.

15. The dyestuff of claim 14, wherein said $D_2$ is

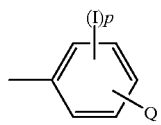

wherein:

I is —$SO_3H$, $C_{1-4}$ alkoxyl or $C_{1-4}$ alkoxycarbinol;

p is 0, 1, 2, or 3; and

Q is —$SO_2$—Y, —CONH—$(CH_2)_n$—$SO_2$—Y.

16. The dyestuff of claim 14, wherein said $D_2$ is

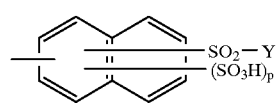

wherein Y is OH, —$CH_2$=$CH_2$, or —$CH_2$—$CH_2$—W, W is a leaving group which is eliminable by a base.

17. The dyestuff of claim 1, wherein said $Z_1$ is

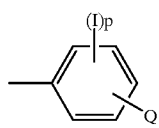

wherein I, p and Q are defined as in claim 1.

18. The dyestuff of claim 1, wherein said $Z_1$ is

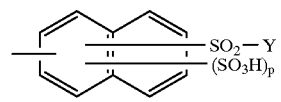

wherein Y is defined as in claim 1.

19. The dyestuff of claim 1, wherein said X is fluorine atom or chlorine atom.

20. The dyestuff of claim 1, wherein said W is chlorine atom, —$OSO_3H$, or

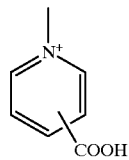

21. The dyestuff of claim 1, wherein said Q is —$SO_2$—Y or —CONH—$(CH_2)_n$—$SO_2$—Y, wherein n and Y are defined as in claim 1.

22. The dyestuff of claim 1, wherein said formula (I) is the following formula (1)

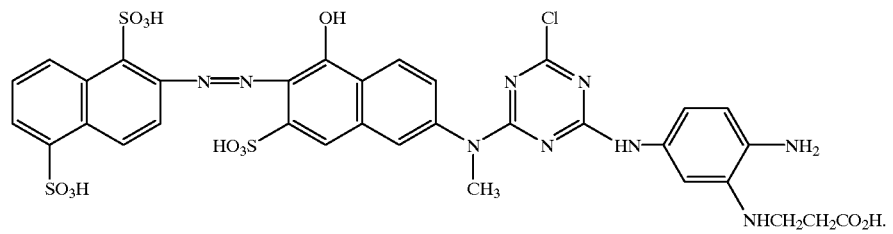

(1)

23. The dyestuff of claim 1, wherein said formula (I) is the following formula (2)

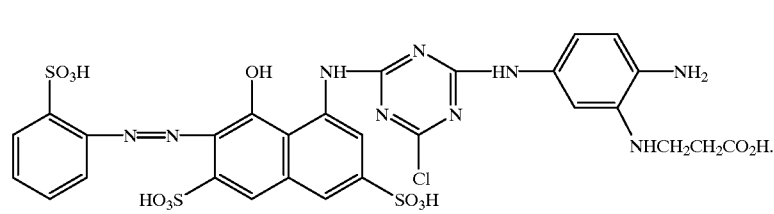

(2)

24. The dyestuff of claim 1, wherein said formula (I) is the following formula (3)

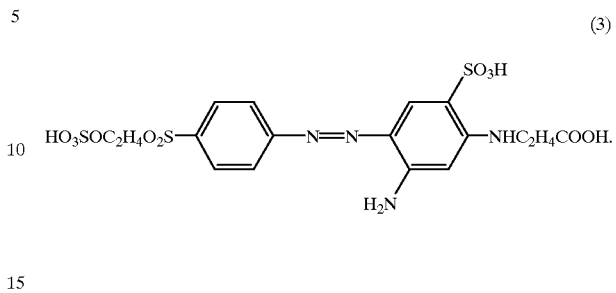

(3)

25. The dyestuff of claim 1, wherein said formula (I) is the following formula (4)

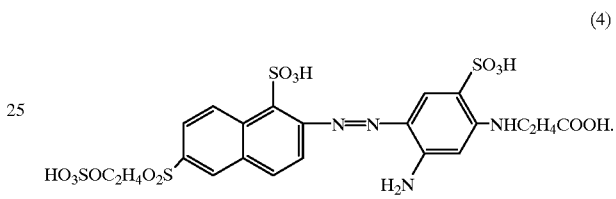

(4)

26. The dyestuff of claim 1, wherein said formula (I) is the following formula (5)

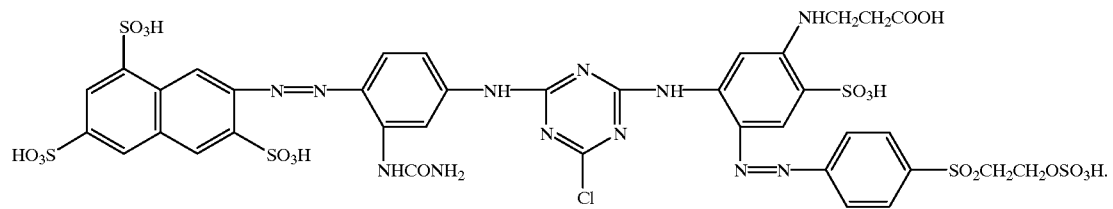
(5)
27. The dyestuff of claim 1, wherein said formula (I) is the following formula (6)
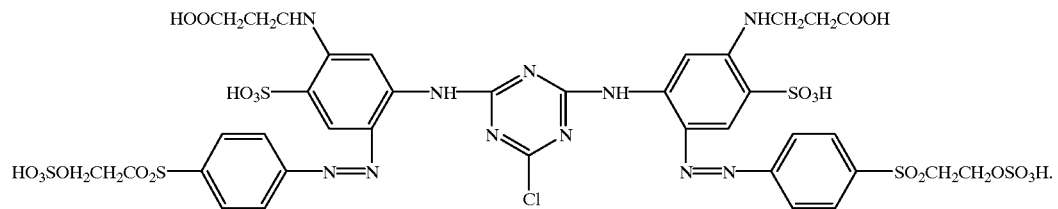
(6)
28. The dyestuff of claim 1, wherein said formula (I) is the following formula (7)
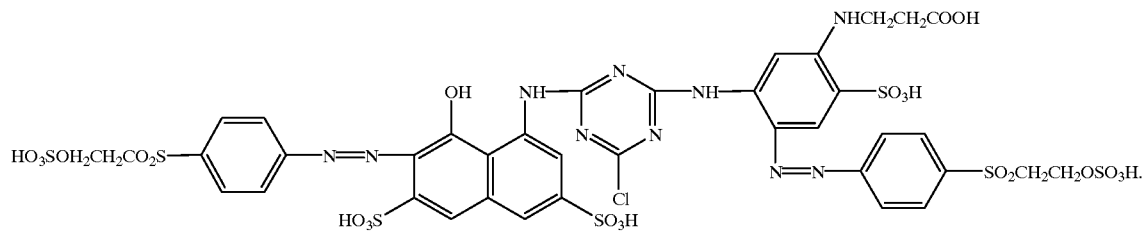
(7)
29. The dyestuff of claim 1, wherein said formula (I) is the following formula (8)
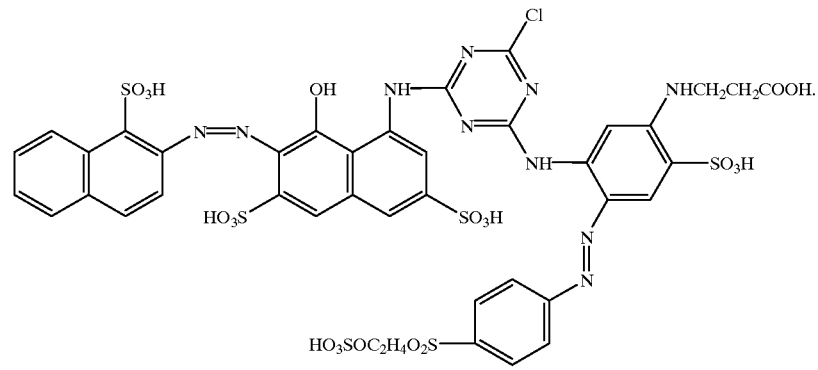
(8)
\* \* \* \* \*